United States Patent [19]

Fan et al.

[11] Patent Number: 4,727,110

[45] Date of Patent: Feb. 23, 1988

[54] PROCESS FOR THE POLYMERIZATION OF SHEAR-STABLE WATER-IN-OIL EMULSIONS

[75] Inventors: You-Ling Fan, East Brunswick; George L. Brode, Somerville, both of N.J.

[73] Assignee: Union Carbide Corporation, Danbury, Conn.

[21] Appl. No.: 785,514

[22] Filed: Oct. 8, 1985

Related U.S. Application Data

[63] Continuation of Ser. No. 602,180, Apr. 19, 1984, abandoned, which is a continuation-in-part of Ser. No. 474,420, Mar. 11, 1983, abandoned, which is a continuation-in-part of Ser. No. 674,951, Nov. 21, 1984, Pat. No. 4,618,647.

[51] Int. Cl.$^4$ ............................................. C08F 2/32
[52] U.S. Cl. ..................................... 524/801; 524/832
[58] Field of Search ............................................ 524/801

[56] References Cited

U.S. PATENT DOCUMENTS

| 3,284,393 | 11/1966 | Vanderhoff et al. | 526/287 |
| 3,414,547 | 12/1968 | Thompson et al. | 526/229 |
| 3,920,599 | 11/1975 | Hurlock et al. | 524/801 |
| 3,996,180 | 12/1976 | Kane | 524/801 |
| 3,997,492 | 12/1976 | Kane et al. | 524/801 |
| 4,070,321 | 1/1978 | Goretta et al. | 524/801 |
| 4,363,886 | 12/1982 | Lipowski et al. | 524/801 |
| 4,379,883 | 4/1983 | Zecker | 524/801 |
| 4,419,483 | 12/1983 | Yanutola | 524/801 |
| 4,439,580 | 3/1984 | Schaper | 524/801 |
| 4,485,209 | 11/1984 | Fan et al. | 524/801 |
| 4,521,552 | 6/1985 | Schnee et al. | 524/801 |

FOREIGN PATENT DOCUMENTS 2116571 9/1983 United Kingdom .

OTHER PUBLICATIONS

F. D. Stefano, *Inverse Emulsion Polymerization of Acrylamide A. Mechanistre Study*, Lehigh University Master's Thesis, Nov. 1981.

Primary Examiner—Joseph L. Schofer
Assistant Examiner—Alex H. Walker
Attorney, Agent, or Firm—Henry H. Gibson

[57] ABSTRACT

A process for the water-in-oil emulsion polymerization of at least one ethylenically-unsaturated water-soluble monomer is disclosed which comprises forming a water-in-oil emulsion of said monomer, forming a small amount of polymer of said monomer in said emulsion to obtain a shear stable emulsion and then completing the polymerization of the monomer.

25 Claims, 3 Drawing Figures

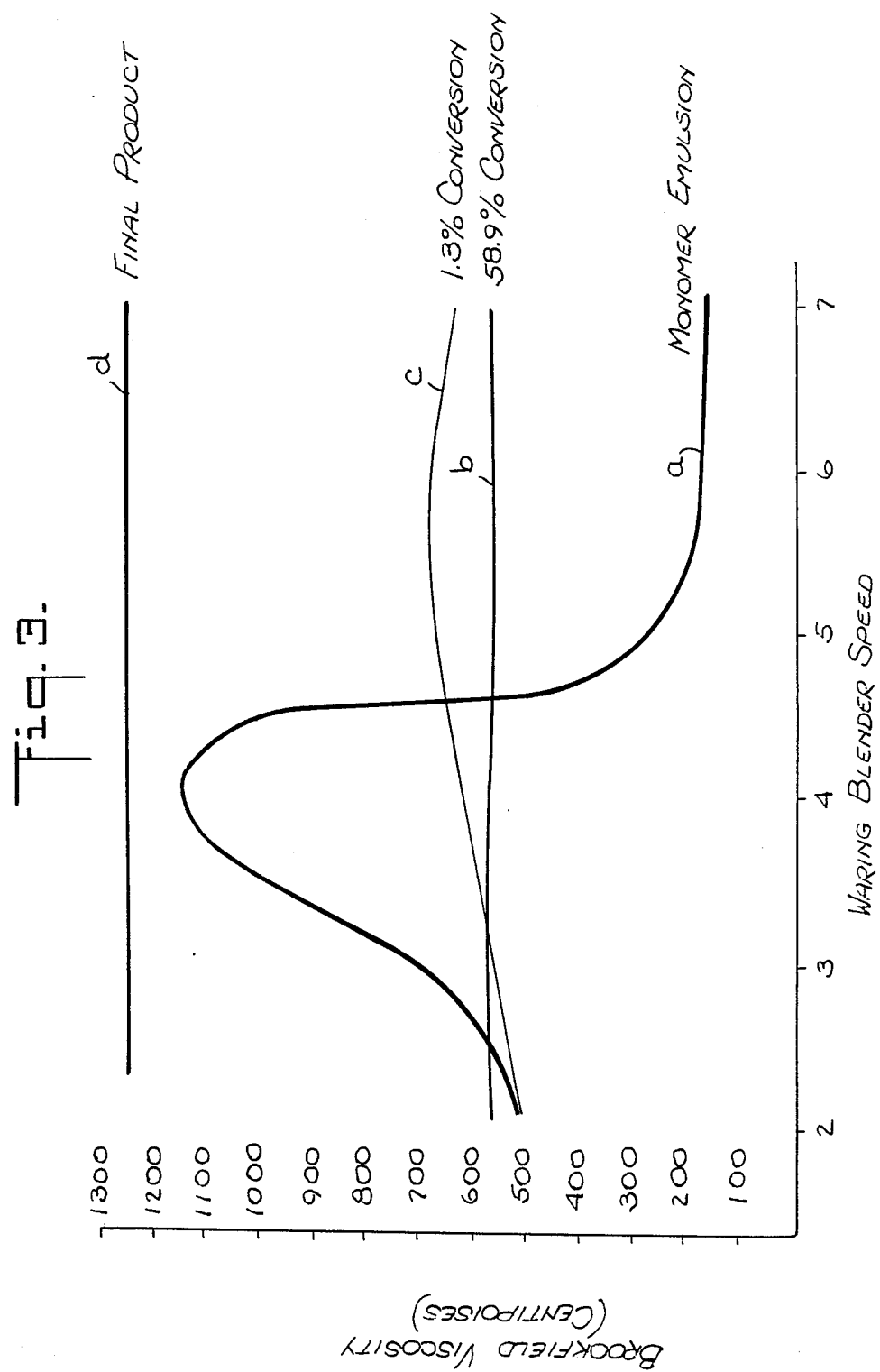

PROCESS FOR THE POLYMERIZATION OF SHEAR-STABLE WATER-IN-OIL EMULSIONS

CROSS-REFERENCE TO RELATED APPLICATION

This application is a continuation of prior application Ser. No. 602,180 filed Apr. 19, 1984, now abandoned, which is a continuation-in-part of commonly-assigned, copending U.S. application Ser. No. 474,420, filed Mar. 11, 1983 now abandoned and refiled Nov. 21, 1984 as a continuation-in-part of U.S. application Ser. No. 674,951, issuing as U.S. Pat. No. 4,618,647.

BACKGROUND OF THE INVENTION

This invention relates to a process for producing a polymer water-in-oil emulsion; and more particularly and in a preferred embodiment, to a process for producing a water-in-oil emulsion of a linear, high molecular weight polymer.

Water-in-oil emulsion polymerization processes, in which a water-soluble monomer is emulsified in an oil phase and polymerized therein, are well known in the art. For example, U.S. Pat. No. 3,284,393 describes such a process wherein water-soluble monomers are polymerized to high molecular weight polymers or copolymers utilizing a water-in-oil emulsion polymerization procedure. In the polymerization process described in said patent, one or a plurality of water-soluble monomers, or an aqueous solution thereof, are emulsified in an oil phase by means of a water-in-oil emulsifier and emulsion-polymerized under free radical forming conditions to form a polymeric latex in which the oil phase is the dispersion medium.

A water-in-oil emulsion of a polymer is produced by such a water-in-oil emulsion polymerization process, from which may be formed an aqueous solution of such polymer by inverting the emulsion with an inverting surfactant. Such "inverse emulsion polymerization" processes are an important part of the commercial production of certain types of water-soluble polymers where a liquid containing a high concentration of polymer is desired. For example, many anionic polymeric flocculants are high molecular weight, water-soluble polymers. The water-in-oil emulsion polymerization route to such polymers is the most significant, commercially-viable method that provides a liquid product containing a high loading (concentration) of such polymers. A liquid product is preferred in commercial flocculation for its ease in handling, transporting and rapid dissolution in water. Similar considerations hold for other types of high molecular weight, water-soluble polymers.

Due to a much higher dispersed phase/continuous phase ratio used in a water-in-oil emulsion than the more conventional oil-in-water emulsion and the requirement for good invertibility, the stability of a water-in-oil emulsion containing unreacted monomer is often only marginal. In fact, under the influence of a high shear field, in particular at elevated temperatures, a monomer emulsion can break down quite readily, resulting in phase separation. Polymerization of such an unstable monomer emulsion would inevitably lead to the formation of gels. Since the breaking down of a monomer emulsion by a shear field, which may result from a circulation pump, or a homogenizer, or in-line mixers, or a high speed of agitation, is more likely to occur at elevated temperatures, usually near or at the intended polymerization temperature, a stable monomer emulsion must be attained at this stage to prevent reactor fouling.

It has been noted that severe gelling problems (i.e., formation of coagulum) are encountered in attempting to form polymers in water-in-oil emulsions using a free-radical initiator. Since such polymerizations are highly exothermic, an external heat exchanger in a circulating loop used to cool the polymerization reaction often results in severe gellation of the entire mass. It was postulated that the high shear imparted to the emulsion, particularly at elevated temperature, during circulation in the external loop caused the breakdown of the emulsified droplets and their subsequent gellation.

This gellation problem was overcome by the novel use of two different kinds of initiators in the water-in-oil emulsion polymerization process. Specifically, it has been discovered that the shear stability of a monomer water-in-oil emulsion is drastically enhanced once a small amount of polymer is formed in situ in the monomer emulsion. In fact, such a monomer emulsion becomes shear-resistant even at elevated temperatures. A stable monomer water-in-oil emulsion can be achieved by initiating the polymerization during the heat-up process using a first, very reactive initiator and once a small amount of polymer is present therein, a stable water-in-oil emulsion results. The polymerization may then be completed by using a second, less reactive initiator at the desired reaction temperature. This process is described more fully in commonly-assigned, copending U.S. application Ser. No. 474,420, filed Mar. 11, 1983, the disclosure of which is hereby incorporated herein by reference.

SUMMARY OF THE INVENTION

The present invention, in its broadest aspects, is an improved process for preparing a water-in-oil emulsion of a polymer of a water-soluble monomer which comprises forming a water-in-oil emulsion of that monomer, forming a small amount of polymer of such monomer in that emulsion to make it shear-stable, and thereafter completing polymerization of said monomer to said polymer. Due to the fact that the emulsion is rendered shear-stable, any convenient polymerization procedure may then be employed without the danger of gel formation. For example, the emulsion may be polymerized and cooled by circulating at least part of the emulsion during polymerization through a circulating loop outside of the polymerization apparatus to remove the heat generated during the polymerization reaction. The present invention is particularly applicable to the preparation of water-in-oil emulsions of high molecular weight, linear, water-soluble polymers, although it is expected to be useful in the preparation of water-in-oil emulsions of any water-soluble polymer.

BRIEF DESCRIPTION OF THE DRAWINGS

FIG. 3 illustrates the shear stability of a water-in-oil emulsion at different stages of polymerization.

DESCRIPTION OF THE PREFERRED EMBODIMENTS

Figure 1:
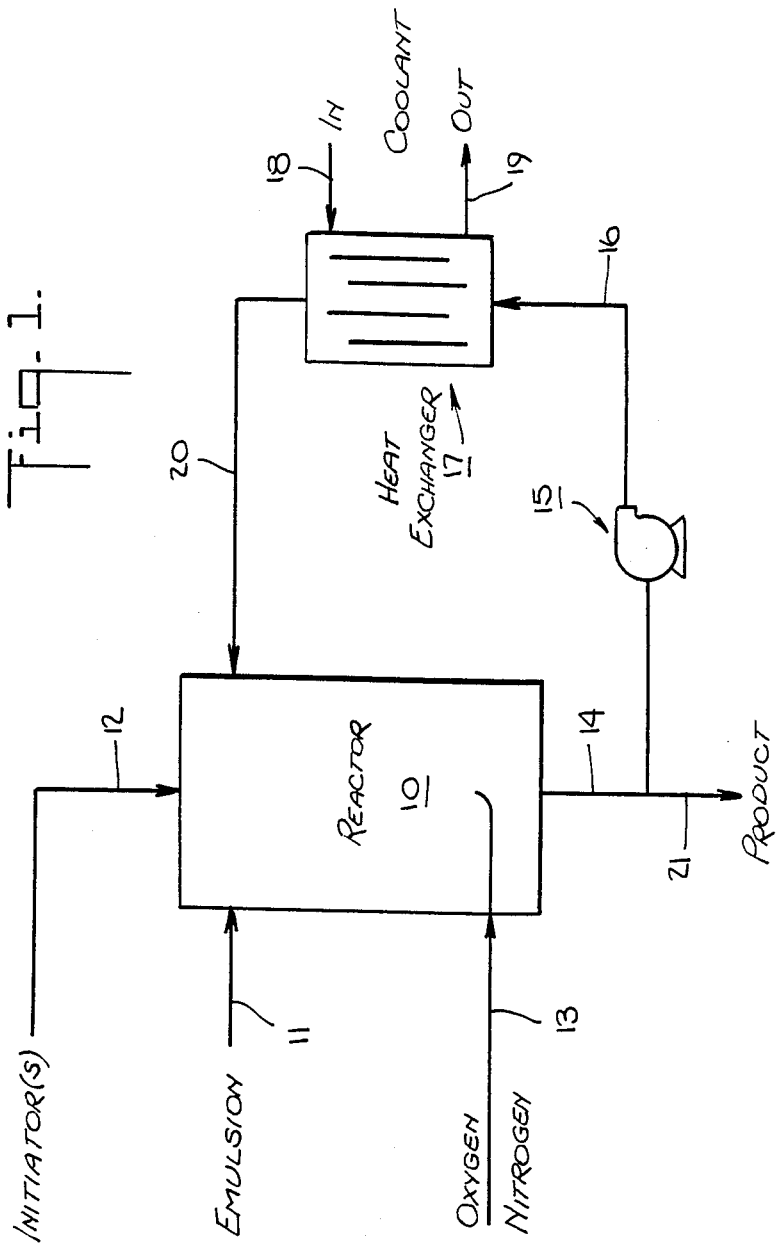
FIGS. 1 and 2 are schematic illustrations of alternate embodiments of the process of the present invention.

The improved process of the present invention, broadly stated, includes the following steps:

(1) forming a water-in-oil emulsion of at least one water-soluble monomer;

(2) forming a small amount of water-soluble polymer of said monomer in said emulsion to obtain a shear-stable, water-in-oil emulsion; and (3) thereafter completing polymerization of said monomer to form a water-in-oil emulsion of said water-soluble polymer.

The process of the present invention offers a number of important advantages over water-in-oil emulsion polymerization processes taught in the prior art. Firstly, the problem of gellation during polymerization is substantially completely eliminated since the monomer water-in-oil emulsion is shear stable. Secondly, due to the shear stability of the monomer emulsion, a heat exchanger can be employed in an external circulating loop to remove the high heat of polymerization generated during the reaction, without the high shear of such a pumping operation causing undesirable gellation. Furthermore, the use of an external loop allows the polymerization to be run at a very fast rate while still ensuring the preparation linear high molecular weight polymers having greatly decreased chain branching or cross-linking because of the good control of reaction temperature obtained thereby. The process of the present invention thus remedies significant disadvantages of prior art water-in-oil emulsion polymerization processes and provides an opportunity for the efficient, commercial production of linear, high molecular weight water-soluble polymers without the serious gellation problems of the prior art.

The process of the present invention is expected to be useful for the polymerization of any water-soluble monomer(s) which may be polymerized to water-soluble polymers by water-in-oil emulsion polymerization. For example, water-in-oil emulsion polymerization may be employed to homopolymerize and interpolymerize one or more of the following water-soluble monomers: acrylic and methacrylic acid; acrylic and methacrylic acid salts of the formula

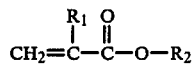

wherein $R_1$ is a hydrogen atom or a methyl group and $R_2$ is a hydrogen atom, an alkali metal atom (e.g., sodium, potassium), an ammonium group, an organoammonium group of the formula $(R_3)$ $(R_4)$ $(R_5)$ NH+ (where $R_3$, $R_4$ and $R_5$ are independently selected from a hydrogen atom, an alkyl group having from 1 to 18 carbon atoms (it may be necessary to control the number and length of long-chain alkyl groups to assure that the monomer is water-soluble), such as 1 to 3 carbon atoms, an aryl group, such as a benzyl group, or a hydroxyalkyl group having from 1 to 3 carbon atoms, such as triethanolamine, or mixtures thereof); acrylamide and methacrylamide and derivatives thereof including acrylamido- and methacrylamido monomers of the formula:

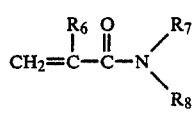

wherein $R_6$ is a hydrogen atom or a methyl group; wherein $R_7$ is a hydrogen atom, a methyl group or an ethyl group; wherein $R_8$ is a hydrogen atom, a methyl group, an ethyl group or $-R_9-SO_3X$, wherein $R_9$ is a divalent hydrocarbon group (e.g., alkylene, phenylene, cycloalkylene) having from 1 to 13 carbon atoms, preferably an alkylene group having from 2 to 8 carbon atoms, a cycloalkylene group having from 6 to 8 carbon atoms, or phenylene, most preferably $-C(CH_3)_2-CH_2-$, $-CH_2CH_2-$,

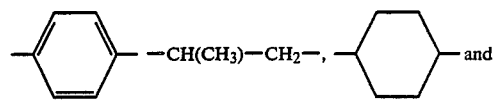

X is a monovalent cation such as a hydrogen atom, an alkali metal atom (e.g., sodium, potassium), an ammonium group, an organoammonium group of the formula $(R_{37})$ $(R_{38})$ $(R_{39})$ NH+ wherein $R_{37}$, $R_{38}$, $R_{39}$ are independently selected from a hydrogen atom, an alkyl group having from 1 to 18 carbon atoms (it may be necessary to control the number and length of long-chain alkyl groups to assure that the monomer is water-soluble) such as 1 to 3 carbon atoms, an aryl group such as a phenyl or benzyl group, or a hydroxyalkyl group having from 1 to 3 carbon atoms such as triethanolamine, or mixtures thereof, etc.; vinyl sulfonates such as sodium vinyl sulfonate; olefinic dicarboxylic acids such as maleic acid; and the like.

Specific examples of water-soluble monomers which may be homopolymerized or interpolymerized by the process of the present invention are acrylic and methacrylic acid; salts thereof such as sodium acrylate and ammonium acrylate; acrylamide and methacrylamide; aminoalkyl- and dialkylaminoalkyl-acrylates and -methacrylates such as dimethylaminoethyl methacrylate; acrylamido- and methacrylamido-sulfonic acids and sulfonates such as 2-acrylamido-2-methylpropanesulfonic acid (available from the Lubrizol Corporation under its tradename, and hereinafter referred to as, "AMPS"), sodium "AMPS", ammonium "AMPS", organoammonium "AMPS".

These water-soluble monomers may be interpolymerized with a minor amount (i.e., less than about 20 mol %, preferably less than about 10 mole %, based on the total monomers fed to the reaction) of one or more hydrophobic vinyl monomers to impart certain desirable properties to the resulting polymer; i.e. vinyl monomers of the formula

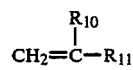

wherein $R_{10}$ is a hydrogen atom or a methyl group and $R_{11}$ is

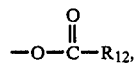

a halogen atom (e.g., chlorine), $-O-R_{13}$,

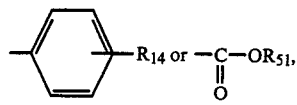

wherein $R_{51}$ is an alkyl group, an aryl group or an aralkyl group having from 1 to 18 carbon atoms, wherein $R_{12}$ is an alkyl group having from 1 to 8 carbon atoms, $R_{13}$ is an alkyl group having from 1 to 6 carbon atoms, preferably 2–4 carbon atoms, $R_{14}$ is a hydrogen atom, a methyl group, an ethyl group, or a halogen atom (e.g., chlorine), preferably a hydrogen atom or a methyl group, with the proviso that $R_{10}$ is preferably a hydrogen atom when $R_{12}$ is an alkyl group. Specific examples of suitable copolymerizable hydrophobic vinyl monomers are alkyl esters of acrylic and methacrylic acids such as methyl acrylate, methyl methacrylate, ethyl acrylate, ethyl methacrylate, butyl acrylate, isobutyl acrylate, dodecyl acrylate, 2-ethylhexyl acrylate, etc.; vinyl esters such as vinyl acetate, vinyl propionate, vinyl butyrate, etc.; vinylbenzenes such as styrene, alpha-methyl styrene, vinyl toluene; vinyl ethers such as propyl vinyl ether, butyl vinyl ether, isobutyl vinyl ether, methyl vinyl ether, ethyl vinyl ether, etc.; vinyl halides such as vinyl chloride, vinylidene chloride, etc.; and the like.

The preferred water-soluble monomers are acrylamide, "AMPS" and sodium "AMPS", sodium acrylate, and ammonium acrylate. The preferred hydrophobic monomers are vinyl acetate, ethyl acrylate, styrene and methyl methacrylate.

As stated above, the process of this invention may be used to prepare homopolymers or interpolymers of monomers which may be polymerized by water-in-oil emulsion polymerization, such as the monomers exemplified above. By "interpolymers" is meant copolymers of two of such monomers, terpolymers of three of such monomers, tetrapolymers of four of such monomers, and higher polymers if desired. The number of different monomers employed in the polymerization process is not critical and may be varied depending upon the particular polymer desired. The process of the present invention is especially useful for the preparation of anionic, linear, high molecular weight polymers useful as flocculants in treating, for example, waste mineral processing streams, and therefore the process of the invention will be described in detail below mostly with respect to such polymers merely as a matter of convenience. It is to be expressly understood however that the process of the present invention is not limited to preparing only such types of polymers; rather, it is the intention that any water-soluble monomer capable of polymerization by water-in-oil emulsion polymerization to a water-soluble polymer may be polymerized by the process of this invention.

Moreover, the process of the present invention is particularly useful in combination with one or both of the dual-initiator process embodiment described in detail in the aforementioned copending U.S. Application Ser. No. 474,420, and an external circulating loop for cooling the water-in-oil emulsion during polymerization. Therefore, the present invention will be described in detail below mostly with respect to these particular embodiments as a matter of convenience. Nevertheless, it is to be expressly understood that the present invention should not be limited thereby. Specifically, it is the intention that the present invention broadly is a water-in-oil emulsion polymerization process including the steps of first forming a water-in-oil emulsion of a water-soluble monomer, forming in that emulsion a small amount of polymer of that monomer to obtain a shear-stable emulsion, and thereafter completing the polymerization of said monomer in said emulsion.

For example, as will be described below in more detail, the formation of the small amount of polymer necessary to obtain a shear-stable emulsion, as well as the subsequent completion of the polymerization of that monomer, may be achieved using only a single initiator. Moreover, conventional cooling means such as internal cooling coils, jacketed reactor vessels, etc., may be conveniently used to cool the shear-stable emulsion during completion of the polymerization. It is, however, preferred that the process of the present invention simultaneously employ both the dual-initiator embodiment and the circulating loop cooling embodiment to obtain the water-in-oil emulsion of the water-soluble polymer.

Broadly, the process of the present invention includes the step of forming a water-in-oil emulsion of at least one monomer (normally, a water-soluble monomer) from the combination of (1) an aqueous phase comprising an aqueous solution containing at least one such monomer and (2) an oil phase comprising a mixture of a hydrophobic liquid and an oil-soluble surfactant. If it is desired to include a hydrophobic monomer into the polymer being polymerized, one or more hydrophobic monomers may be incorporated into the oil phase, i.e. the mixture of the hydrophobic liquid and oil-soluble surfactant. The combined aqueous and oil phases may be homogenized or emulsified to form a water-in-oil emulsion containing the water-soluble monomer(s), the hydrophobic liquid, any hydrophobic monomer(s), water and the oil-soluble surfactant. The resulting monomer water-in-oil emulsion is preferably deoxygenated and thereafter the monomers are polymerized.

The polymerization reaction normally generates considerable heat which must be removed. For example, when one of the water-soluble monomers being polymerized is acrylamide, due to the very fast rate of its polymerization (about $8 \times 10^{-3}$ moles/liter.sec. at 50° C.) and its high heat of polymerization (about $-20$ Kcal/mole), an enormous amount of heat is generated during the polymerization reaction which must be dissipated properly to avoid the occurrence of a runaway exotherm and the formation of gels. An effective and the preferred method for heat removal is the use of an external heat exchanger connected to the reactor through a closed circulating loop. The reaction mixture may be circulated through the heat exchanger by a pump during the course of the polymerization. Any conventional apparatus may be used to provide the external heat exchange loop. Alternatively, any other convenient means (e.g., internal cooling coils, a jacketed reaction vessel, etc.) may be used to cool the emulsion being polymerized.

The most significant advantage offered by the present invention is that the emulsion, during polymerization, may be cooled and the polymerization controlled by the use of any convenient cooling means due to the fact that the emulsion has been rendered shear-stable by the formation of a small amount of polymer therein at the very start of the polymerization. The most preferred manner of obtaining a shear-stable emulsion, as well as completing the subsequent polymerization, is to use the dual-initiator technique disclosed in the aforementioned copending Application Ser. No. 474,420. In general terms, the technique comprises initiating polymerization of the monomer at a low temperature using a first, low temperature polymerization initiator to form a small amount of polymer in situ from that monomer, thereby converting the emulsion into shear-stable emulsion. The formation of that small amount of polymer occurs at a relatively low temperature and before the emulsion has reached the temperature at which the bulk of the polymerization is to occur. Subsequently, a second, higher temperature polymerization initiator is employed to complete the polymerization.

A second means of obtaining a shear-stable emulsion comprises the use of only a single polymerization initiator, which may be either a low temperature or a high temperature initiator. For example, a sufficient amount of an appropriate initiator can be incorporated into the monomer water-in-oil emulsion and a small amount of polymer formed therein at a low temperature to convert the emulsion into a shear-stable emulsion. Thereafter, the polymerization may be completed using the same initiator.

In the case of a low temperature initiator, only a small amount is required to initiate the polymerization and form the small amount of polymer necessary to convert the emulsion into a shear-stable one. However, a larger amount would be required to complete the polymerization. In the case of a higher temperature initiator, a relatively larger amount would be required to initiate polymerization at the lower temperature and form the shear-stable emulsion, although that amount would be sufficient in most cases to subsequently permit completion of the polymerization. The amount of initiator required will depend upon the monomers being polymerized, the temperature of the initial polymerization and the particular initiator employed.

With respect to either the dual-initiator technique or the above-described single initiator embodiment, the process of the invention can be performed in a single vessel or in more than one vessel. Either operation may be conducted batchwise or in a continuous fashion. For example, in either embodiment, the formation of the shear-stable emulsion may be conducted in a first reactor and the polymerization subsequently completed in a different vessel. Either of both vessels may be provided with convenient cooling means, such as discussed above. The particular arrangement of apparatus is not critical. The important factors determining selection of appropriate equipment are that a sufficient amount of polymer be formed at a low temperature during the initial polymerization in order to provide shear-stability to the monomer emulsion, and that polymer conversion and shear-stability be obtained without excessive shear (i.e., sufficient to break down the emulsion and prevent obtaining shear-stability) and before reaching the higher temperature necessary or desirable for completion of the polymerization reaction. One additional factor must be considered. The small amount of polymer that is formed during the initial polymerization, resulting in a shear-stable emulsion, must be of a reasonably high molecular weight. If the molecular weight of that small amount of polymer is not reasonably high, it is possible that the small amount produced during the initial stages will be insufficient to provide the requisite shear-stability. The particular minimum level of molecular weight will, of course, vary depending upon the particular emulsion being polymerized. However, with most vinyl-type monomers, relatively high molecular weight polymer is formed almost immediately upon initiation of the polymerization reaction; therefore, when polymerizing such monomers by the process of the present invention, it is expected that the small amount of polymer formed at the beginning of the polymerization will have a sufficiently high molecular weight to provide shear-stability to the emulsion.

FIG. 1 of the drawings schematically illustrates the process of the present invention, including the preferred circulating loop cooling embodiment. With reference to FIG. 1, a monomer water-in-oil emulsion is fed via line 11 to a reactor 10 which is preferably provided with suitable agitation means (not shown). Prior to initiating any polymerization, the emulsion is preferably deaerated such as by sparging a gas such as nitrogen through the emulsion in the reactor via line 13. Alternatively, the emulsion may be deaerated prior to being fed to reactor 10. The same line 13 may be used during the actual polymerization to sparge air or oxygen through the emulsion in order to control the rate of polymerization, as discussed in more detail below.

Once the emulsion has been deaerated, one or more suitable polymerization initiators may be fed to the reactor via line 12. The emulsion is then agitated and heated by any suitable means (not shown) to initiate the polymerization. Simultaneously, or shortly thereafter, the emulsion may be pumped through a circulating loop in order to cool same during the polymerization reaction. Specifically, the emulsion is withdrawn via line 14 and a pump 15 is used to feed the emulsion through a heat exchanger 17 and back to the reactor via lines 16 and 20, respectively. A suitable coolant is fed to the heat exchanger via lines 18 and 19 to provide the necessary heat transfer. At the conclusion of polymerization, product emulsion may be withdrawn via line 21.

If the dual-initiator embodiment is employed, the low temperature initiator may be added via line 12 to the reactor before heating is commenced. As a result of that heating to a relatively low temperature, a small amount of polymer is formed in the emulsion and a shear-stable emulsion is provided. Subsequently, the second, higher temperature initiator may be added to the reactor and polymerization complete, normally at a higher temperature. The timing and procedure for adding both initiators in this embodiment is discussed in more detail below.

Alternatively, if a single initiator is employed, a sufficient amount must be present to initiate the polymerization and form a shear-stable emulsion. Depending upon the initiator utilized, a sufficient amount of initiator to complete the polymerization may be added at the outset or may be added incrementally throughout the course of the polymerization reaction.

Regardless of whether a single initiator or the preferred dual-initiator technique is used, once a small amount of polymer is formed, and a shear-stable emulsion obtained, the emulsion may be heated to the higher temperature and pumped through the circulating loop without fear of undesirable gel formation occurring.

The emulsion fed to the reactor may be formed using conventional techniques. The preferred method is to add the pre-mixed aqueous phase to the oil phase with suitable agitation to form the emulsion. Alternatively, the oil phase, preferably pre-mixed, may be added to the aqueous phase without agitating during the addition. Subsequently, in this particular embodiment, agitation is commenced to form a water-in-oil emulsion. A third alternative is to continously, in-line blend pre-mixed oil and aqueous phases to directly form a water-in-oil emulsion. In the case of the preferred mode, the addition of the aqueous phase to the oil phase, an additional vessel may be required to pre-mix the aqueous phase prior to that addition. That additional vessel may not be required in the second mode since components of the oil phase may be added directly to the quiescent aqueous phase (e.g., the hydrophobic monomer(s) may be added separately from a mixture of an oil-soluble surfactant and the necessary hydrophobic liquid).

In any event, regardless of the particular technique employed to prepare the monomer water-in-oil emulsion, care should be taken to prevent accidental polymerization thereof, such as maintaining the aqueous phase and the emulsion at a low temperature (e.g., less than about 25° C.) or by sparging air through the aqueous phase or the completed emulsion. In the latter instance, it will be necessary to deaerate the emulsion prior to initiation of the polymerization. Moreover, the polymerization initiator(s) should not be added until after the water-in-oil emulsion is formed in order to prevent premature polymerization of the monomers.

Figure 2:
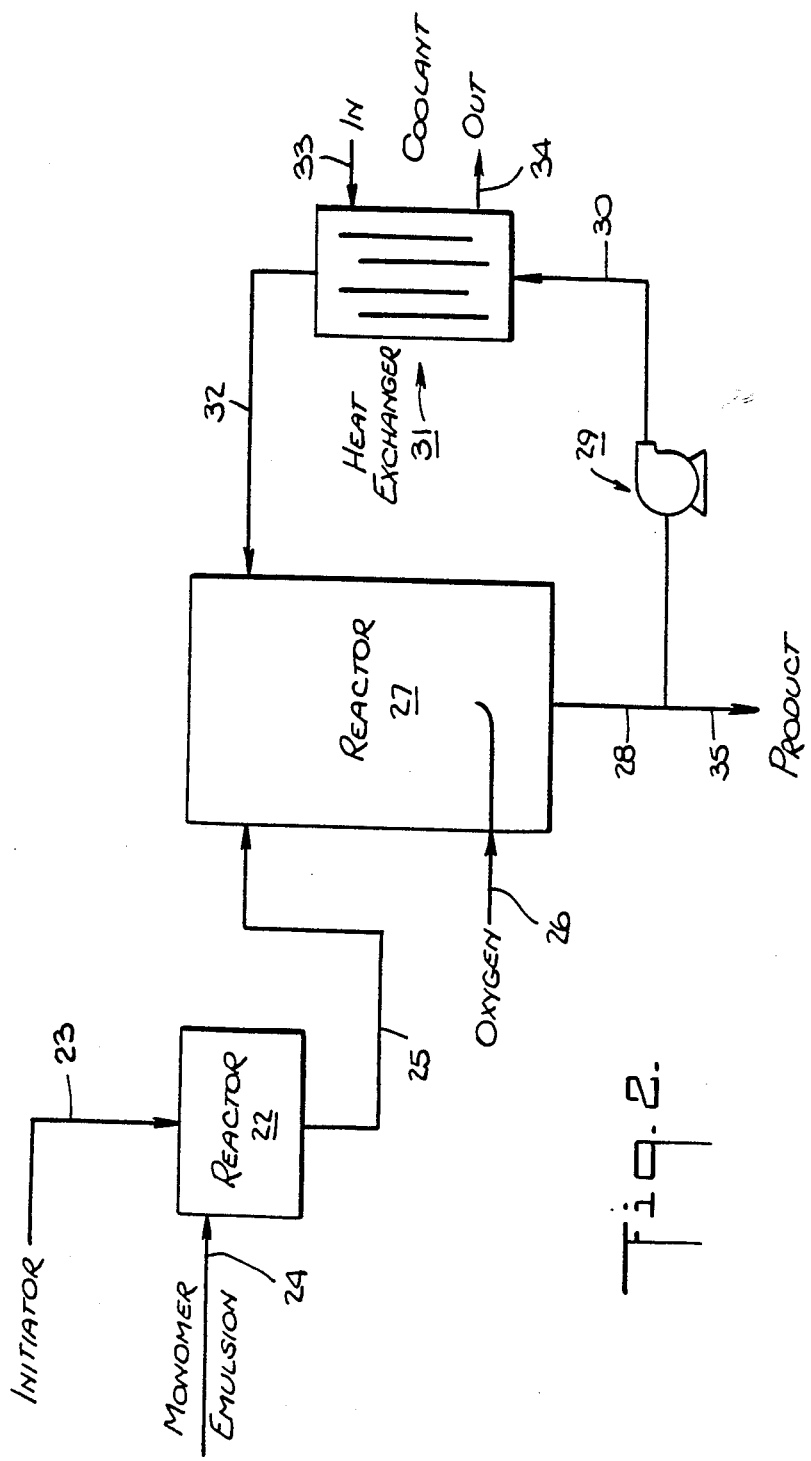

An alternate manner of practicing the present invention is the semi-continuous process shown schematically in FIG. 2. According to that process, a monomer water-in-oil emulsion (preferably kept at a temperature below 25° C. and deaerated) is continuously fed via line 24 to a first, small reactor 22 along with a suitable initiator via line 23. The amount of initiator, the temperature and amount of residence time are controlled in reactor 22 to provide a shear-stable emulsion containing only a small amount of in situ—formed polymer, which is then continuously fed via line 25 to a second, larger batch reactor 27. Once a sufficient amount of emulsion is in reactor 27, the polymerization may be completed therein. The amount of initiator initially provided to the process must be sufficient to allow completion of the polymerization or additional initiator may be introduced into the large batch reactor 27. The emulsion is cooled during polymerization by withdrawing a portion of the emulsion from reactor 27 through line 28 and pumping it (using pump 29) through a heat exchanger 31 and back to the reactor through lines 30 and 32, respectively. A suitable coolant may be provided to the heat exchanger via lines 33 and 34. Product may be obtained through line 35.

Regardless of the particular arrangement of apparatus employed, the polymerization may be initiated by adding to the emulsion an initiator capable of polymerizing the monomers at low temperature, and heating the resulting emulsion/initiator combination to a low temperature sufficient to initiate polymerization of the monomers. Once a small amount of polymer is formed therein, and a shear-stable emulsion formed, the polymerization may then be continued at a higher temperature and completed to form a water-in-oil emulsion of the resulting polymer. The polymer water-in-oil emulsion may be recovered and the polymer itself may be recovered should that be desirable. Alternatively, an inverting surfactant may be added to the polymer water-in-oil emulsion to invert the emulsion on contact with water.

To obtain the aqueous phase used to prepare the monomer emulsion, an aqueous solution containing at least one water-soluble monomer is prepared. It is preferred that the monomers, as well as the other raw materials, be of high purity so as to produce high molecular weight polymers. The number of monomers contained in the aqueous solution is not critical and any combination of any water-soluble monomer having a water-solubility of at least about 50 weight percent may be employed. The aqueous solution may be prepared by conventional techniques and may contain the monomers in any concentration, for example, from about 10 to about 75 weight percent, upon the weight of the aqueous solution. If the water-soluble monomers include acids, for example, acrylic acid or "AMPS", it may be convenient to first react the acid with a suitable base, preferably with an equivalent amount of base, such as sodium hydroxide, to provide, e.g., a sodium salt solution having a pH from about 5 to about 11, preferably from about 6 to about 10, depending upon the type and amount of base employed. The preferred base is sodium hydroxide. Any additional water-soluble monomers may then be added to the resulting salt solution to provide the aqueous solution to be combined with the hydrophobic liquid-containing mixture.

It is preferred to also add a chelating agent to the aqueous phase in order to complex any metal ions present therein, which if present could act as chain transfer agents and inhibit or prevent formation of high molecular weight polymers. For example, aqueous acrylamide may contain sufficient amounts of cupric ions to inhibit formation of high molecular weight polymer. A chelating agent such as the pentasodium salt of diethylene triamine pentaacetic acid (available from Dow Chemical Corporation under its trademark VERSENEX 80) should preferably be employed to complex such metal ions before polymerization is commenced. The particular chelating agent is not critical and will vary depending on the monomer(s) being polymerized.

The oil phase, to be combined with the foregoing aqueous phase, generally comprises a mixture of a hydrophobic liquid and an oil-soluble surfactant and, optionally, one or more hydrophobic monomers.

The particular hydrophobic liquid is not critical. Examples of suitable hydrophobic liquids for use herein include benzene, xylene, toluene, mineral oils, kerosenes, petroleum, and mixtures thereof. A preferred hydrophobic liquid is an aliphatic hydrocarbon available from the Exxon Chemical Co. under its tradename Isopar M.

The hydrophobic monomer(s) which may be added to the oil phase may be any hydrophobic monomer which has a solubility in water of less than about 10 weight percent and includes, for example, one or more of vinyl esters such as vinyl acetate, vinyl propionate, vinyl butyrate, etc.; alkyl acrylates such as ethyl acrylate, butyl acrylate, isobutyl acrylate, dodecyl acrylate, 2-ethylhexyl acrylate, etc.; alkyl methacrylates such as methyl methacrylate; vinyl ethers such as methyl vinyl ether, ethyl vinyl ether, butyl vinyl ether, propyl vinyl ether, isobutyl vinyl ether, etc.; acrylonitrile; styrene and its derivatives, such as alpha-methylstyrene; vinyl halides such as vinyl chloride, vinylidene chloride, etc.; N-vinyl carbazole; and the like.

Oil-soluble surfactants suitable for producing water-in-oil emulsions may be employed in the present invention. Examples of suitable oil-soluble surfactants for use in the oil phase are those of the oil-soluble type having a Hydrophile-Lipophile Balance (HLB) value of from about 1 to about 10, preferably from about 2 to about 6. These surfactants may be referred to as the water-in-oil type. The suitable surfactants include fatty acid esters, such as sorbitan monolaurate, sorbitan monostearate, sorbitan monooleate (such as that available from I.C.I. under its tradename SPAN 80, a preferred surfactant), sorbitan trioleate, etc.; mono- and diglycerides, such as mono- and diglycerides obtained from the glycerolysis of edible fats; polyoxyethylenated fatty acid esters, such as polyoxyethylenated (4) sorbitan monostearate; polyoxyethylenated linear alcohols (such as Tergitol 15-S-3 and Tergitol 25-L-3 available from Union Carbide Corp.); polyoxyethylene sorbitol esters, such as polyoxyethylene sorbitol beeswax derivative; polyoxyethylenated alcohols such as polyoxyethylenated (2) cetyl ether, and the like. 1

The oil phase may contain any convenient amount of hydrophobic monomer, depending upon the particular monomer and the desired content of such monomers in the final polymer product. Similarly, the amount of oil-soluble surfactant in the oil phase is generally at least that amount sufficient to form the resulting monomer water-in-oil emulsion when the oil phase is blended with the foregoing aqueous phase. However, generally speaking, the oil phase contains from about 1 to about 10 weight percent of the surfactant, based on the total weight of the oil phase. The amount of hydrophobic liquid in the oil phase is generally on the order of from about 70 to about 99 weight percent, based on the total weight of the oil phase.

The oil phase is then blended or combined with the foregoing aqueous phase and the resulting mixture may be homogenized or emulsified to form a water-in-oil emulsion containing the monomer(s) to be polymerized. Emulsification takes place by subjecting the mixture to high shear mixing techniques and using equipment which are generally well-known in the art. These include the use of homogenizers, high speed mixers and any other techniques for obtaining high shear mixing. The emulsification generally is carried out at a temperature of from about 10° to about 30° C., preferably below about 25° C. The emulsification may be carried out either continuously or in a bath process. It is preferred to add the water phase to the agitated oil phase to form the water-in-oil emulsion. This approach would require an additional vessel (for preparation of the aqueous phase) beyond what is shown in FIG. 1. Alternatively, the oil phase may be added to the unagitated aqueous phase, followed by agitation to form the water-in-oil emulsion.

The water-in-oil emulsions so prepared normally have a rather narrow particle size distribution. The diameters of the majority of the particles may range from about 0.2 to about 5 microns, preferably from about 1 to about 2 microns.

The resulting monomer water-in-oil emulsion comprises:

(a) an aqueous phase constituting from about 50 to about 80, preferably from about 60 to about 78, weight percent of the total emulsion and containing the water-soluble monomer(s) wherein the monomers constitute from about 20 to about 80, preferably from about 25 to about 50, weight percent of the total aqueous phase;

(b) an oil phase constituting from about 15 to about 45, preferably from about 20 to about 40, weight percent of the total emulsion and containing a hydrophobic liquid and, optionally, from about 0.1 to about 20, preferably from about 1 to about 10, weight percent, based on the weight of the oil phase, of one or more hydrophobic monomers; and (c) an oil-soluble surfactant constituting from about 0.1 to about 5, preferably from about 1 to about 3, weight percent of the total emulsion.

It is preferred to maintain the monomer emulsion (as well as the aqueous phase prior to emulsification) at a sufficiently low temperature (e.g., below about 25° C.) so as to avoid accidental polymerization. Other means, such as sparging air therethrough, may also be employed.

After forming the monomer water-in-oil emulsion, either during or after addition to a reactor, it is generally deoxygenated, preferably by sparging with nitrogen; alternatively, part or all of the emulsion may be subjected to a vacuum of from about 50 to about 500, preferably from about 100 to about 200, mm of mercury under an inert gas atmosphere at a temperature of from about 0° to about 30° C., either continuously or as a batch process.

The emulsion may then be polymerized. In the case of the preferred dual initiator technique, a first, highly reactive (i.e., low temperature) initiator useful in polymerizing ethylenically unsaturated monomers is then added to the reactor. Any free radical initiator which is capable of initiating the polymerization at a temperature less than about 45° C. (e.g. 0°–45° C.), preferably between about 20° to 40° C., can be used as the first initiator. Examples of such initiators are shown below in Table I:

TABLE I

| Initiator | $t_{\frac{1}{2}}$ (T °C.)* |
|---|---|
| 2,2'-azobis-(2-cyclopropylpropionitrile) | 5.5 (44.2) |
| 2,2'-azobis-(2,4-dimethyl-4-methoxyvaleronitrile) | 10 (33) |
| 2,2'-azobis-(1-cyclooctanenitrile) | 3.6 (36.6) |
| 1,1'-azobis-3-chlorocumene | 7.8 (42.8) |
| 1,1'-azobis-4-chlorocumene | 17 (36) |
| 2,2'-azobis-2-(4-tolyl)propane | 11.8 (42.8) |
| phenyl-azo-triphenylmethane | 3.4 (43.3) |
| 1,1'-azo-bis-1-(4-tolyl) cyclohexane | 9.5 (43.8) |
| 3-tolyl-azo-triphenylmethane | 2.6 (42.8) |
| isobutyryl peroxide | 0.8 (40) |
| alpha-chloropropionyl-m-chlorobenzoyl peroxide | 12.7 (41) |
| cyclopropane acetyl peroxide | 0.19 (25) |
| benzoyl isobutyryl peroxide | 0.47 (41) |
| m-chlorobenzoyl isobutyl peroxide | 5.5 (40) |
| p-nitrobenzoyl isobutyryl peroxide | 2.4 (40) |
| cyclopentane formyl peroxide | 12.8 (40) |
| cyclohexane formyl peroxide | 1.3 (35) |
| 2-iodobenzoyl-4-nitrobenzoyl peroxide | 3.4 (25) |
| 2-nitrobenzoyl peroxide | 10.8 (25) |
| benzoyl phenylacetyl peroxide | 0.9 (25) |
| phenyl acetyl peroxide | 0.4 (20) |
| Benzoyl-2-[trans-2-(phenyl)vinyl]benzoyl peroxide | 2 (35) |
| cis-4-tert-butylcyclohexane formyl peroxide | 11.4 (40) |
| t-butyl-hydroperoxide/cobalt 2-ethyl hexanoate | 0.18 (25) |
| t-butyl-hydroperoxide/cobalt stearate | 0.14 (45) |
| dimethyl peroxalate | 11.3 (25) |
| di-isopropyl peroxalate | 3.2 (35) |
| di-(tert-butylperoxy)oxalate | 2.8 (35) |
| di-tert-butyl-peroxalate | 1.9 (38) |
| tert-butyl-2-(methylthio)perbenzoate | 7.4 (39) |
| tert-butyl-2-(phenylthio)perbenzoate | 1.6 (40) |
| tert-butyl-triphenyl peracetate | 0.25 (35) |
| p-toluenesulfonyl-p-tolylsulfone | 1.3 (39) |

*$t_{\frac{1}{2}}$ = half-life of initiator, in hours, at the indicated temperature The first initiator may be added to the reactor as is but is preferably added in the form of a solution, i.e., the initiator is dissolved in a suitable solvent, such as a hydrocarbon liquid, e.g., xylene or toluene. The initiator solution typically contains the initiator in an amount of from about 0.1 to about 10, preferably from about 0.5 to about 5, weight percent. Preferably, all of the first initiator is initially added to the reactor containing the monomer water-in-oil emulsion. A preferred first initiator is 2,2'-azobis-(2,4-dimethyl-4-methoxyvaleronitrile), a product obtained from E. I. du Pont de Nemours & Co. under its trademark VAZO 33.

The polymerization is then initiated by heating to a temperature of from about 30° to about 60° C., preferably from about 40° to about 50° C. until a small amount of polymer is formed therein and a shear-stable emulsion is obtained. The specific amount of polymer formed is not critical, as long as a shear-stable emulsion is obtained, and will depend upon the specific first initiator employed, the reactivity of the monomers being polymerized, the temperature of polymerization, the time during which the monomer water-in-oil emulsion is subjected to heating in the presence of the first initiator, etc. Generally speaking, it is desirable and it is therefore preferred that this initial polymerization be conducted at a temperature and for a period of time necessary to obtain a shear-stable emulsion, and without subjecting the emulsion to higher polymerization temperatures prior to obtaining that shear-stability, so that the polymerization can be completed using the second, less reactive initiator at those higher temperatures. The amount of polymer necessary to obtain a shear-stable emulsion will necessarily depend upon the monomers being polymerized, the molecular weight of the resulting polymer, the temperature of polymerization, the amount of shear which the emulsion experiences during polymerization, etc. Those skilled in the art should be capable of determining the necessary amount of polymer to be formed for a given system to provide a shear-stable emulsion. As a general guideline to assist those skilled in the art to more easily practice the present invention, for a monomer water-in-oil emulsion system which contains 50 to 60 mole percent acrylamide monomer, 1 to 10 mole percent vinyl acetate monomer and 30 to 49 mole percent sodium acrylate monomer, all based upon the total monomers, this initial polymerization is conducted under necessary conditions to obtain from about 1 to about 5 percent, based on the total emulsion, of polymer therein. This level of polymer for this particular combination of monomers produces a shear-stable emulsion. The amount of polymer may be determined using suitable conventional techniques, such as a coagulation test.

The initial polymerization is generally and preferably performed at atmospheric pressure, although sub-atmospheric or super-atmospheric pressures may be used. In addition, the initial polymerization is also preferably carried out under an inert atmosphere, such as a helium, argon or nitrogen atmosphere.

Generally, in the dual-intiator embodiment, the second initiator may be any free radical initiator capable of initiating polymerization of ethylenically-unsaturated monomers at a temperature greater than 40° C., desirably between about 40° and 100° C., preferably between about 45° to 80° C. Examples of such initiators are shown in Table II below.

TABLE II

| Initiator | $t_{\frac{1}{2}}$ (T °C.)* |
|---|---|
| 2,2'-azobis-(2,4-dimethylvaleronitrile) | 10 (52) |
| 2,2'-azobis-(isobutyronitrile) | 10 (64) |
| 2,2'-azobis-2,4,4-trimethylvaleronitrile | 16 (40) |
| 2,2'-azobis-2-methylbutyronitrile | 8.4 (69.8) |
| 2,2'-azobis-2-ethylpropionitrile | 2.3 (80) |
| 1,1'-azobis-1-cyclopentane nitrile | 2.6 (80) |
| 2,2'-azobis-2,3-dimethylbutyronitrile | 7.4 (69.8) |
| 2,2'-azobis-2-methylvaleronitrile | 4.6 (69.8) |

TABLE II-continued

| Initiator | $t_{\frac{1}{2}}$ (T °C.)* |
|---|---|
| 2,2'-azobis-2-cyclobutylpropionitrile | 1.3 (80.5) |
| 1,1'-azobis-1-cyclohexanenitrile | 23 (80) |
| 2,2'-azobis-2-propyl-butyronitrile | 0.75 (80) |
| 2,2'-azobis-2,3,3-trimethylbutyronitrile | 2.6 (80) |
| 2,2'-azobis-2-methylhexylonitrile | 1.2 (80) |
| 2,2'-azobis-2-isopropylbutyronitrile | 1.9 (80.5) |
| 1,1'-azobis-1-cycloheptanenitrile | 2.0 (59) |
| 1,1'-azobis-1-(2-methylcyclohexane)-nitrile | 26 (80) |
| 1,1'-azobis-1-cyclohexanecarbonitrile | 41 (80) |
| 2,2'-azobis-2-isopropyl-3-methylbutyronitrile | 1.5 (80.5) |
| 2,2'-azobis-2-benzylpropionitrile | 1.7 (80) |
| 2,2'-azobis-2-(4-chlorobenzyl)propionitrile | 2.2 (80) |
| 2,2'-azobis-2-(4-nitrobenzyl)propionitrile | 1.9 (80) |
| 1,1'-azobis-1-cyclodecanenitrile | 3.6 (51) |
| azo-bis-isobutyramidine | 27 (60) |
| 2,2'-azobis-methyl-2-methylpropionate | 1.2 (80) |
| azobis-(N,N'—dimethyleneisobutyramidine) | 17.6 (60) |
| azobis-(1-carbomethoxy-3-methylpropane) | 42 (55) |
| 2,2'-azobis-(ethyl-2-methylpropionate) | 4.6 (70) |
| 1,1'-azobis-1-chloro-1-phenylethane | 0.22 (75) |
| 1,1'-azobis-1-chloro-1-(4-bromophenyl)ethane | 1.1 (59) |
| 3,7'-diphenyl-1,2-diaza-1-cycloheptene | 5.1 (61) |
| 1,1'-azo-bis-cumene | 1 (59) |
| 3-bromophenyl-azo-triphenylmethane | 1.7 (54) |
| 2,4-dinitrophenyl-azo-9-phenylfluorene | 0.9 (56) |
| 1-hydroxybutyl-n-butyl peroxide | 11 (79) |
| acetyl peroxide | 61 (55) |
| propionyl peroxide | 10 (65) |
| 2-iodopropionyl peroxide | 0.9 (56) |
| butyryl peroxide | 8.6 (65) |
| beta-allyloxypropionyl peroxide | 9.6 (70) |
| benzoyl peroxide | 14 (70) |
| 2-chlorobenzyl peroxide | 6.1 (80) |
| 2,4-dichlorobenzoyl peroxide | 18 (50) |
| cyclohexane acetyl peroxide | 15 (65) |
| decanoyl peroxide | 12 (60) |
| 4-benzylidenebutyryl peroxide | 8 (50) |
| lauroyl peroxide | 6.7 (70) |
| ethyl-tert-butyl peroxalate | 4.3 (45) |
| tert-butyl perpivalate | 1.5 (70) |
| tert-butyl phenylperacetate | 6.4 (78) |
| potassium persulfate | 61 (60) |

*$t_{\frac{1}{2}}$ = half-life of initiator, in hours, at the indicated temperature The second, less reactive initiator is normally an initiator which polymerizes ethylenically-unsaturated monomers at a temperature higher than the temperature at which the first, highly reactive initiator polymerizes such monomers; preferably these temperatures differ by at least about 5° C.; most preferably, the first, highly reactive initiator reaches a given $t_{\frac{1}{2}}$ (as defined above), in hours, at a temperature which is about 10° C. less than the temperature at which the second, less reactive initiator reaches that same $t_{\frac{1}{2}}$. The second initiator is also preferably added as a solution, in the same or similar concentrations as discussed above for the first initiator. A preferred second initiator is 2,2'-azobis-(2,4-dimethyl valeronitrile), available from E. I. du Pont de Nemours & Co. under its trademark VAZO 52.

The polymerization reaction rate may be controlled by the introduction of small quantities of air (atomospheric air and/or oxygen) into the reaction. The duration and amount of air injection may vary, and it may be repeated as many times as necessary until a desired rate of polymerization is achieved. It is preferred to operate the external heat exchanger in the circulating loop at or near its full cooling capacity while maintaining the desired reaction temperature by the intermittent introduction of air as required.

After the polymerization is complete, an antioxidant may be added to the reaction mass. Any organic antioxidant suitable for the inhibition of free radical reactions may be used. The antioxidant is generally first dissolved in a suitable solvent. The preferred antioxidants include substituted phenols such as 2,6-di-t-butyl-4-methyl phenol (known as "BHT"), thiobisphenol (such as that available from Monsanto under its tradename Santonox-R), and hydroquinone derivatives, such as the monomethyl ether of hydroquinone. The suitable solvents include toluene, benzene, xylene, diethyl ether, methyl acetate, and the like. The antioxidant may be present in the antioxidant solution in amounts of from about 0.1 to about 10, preferably from about 1 to about 5 weight percent.

The antioxidant solution is added to the reaction mass in amounts of from about 0.05 to about 5 parts per hundred parts of polymer. Addition of the antioxidant may be commenced either at the end of the polymerization or after the reaction mixture has been cooled to ambient temperature.

The reaction mass is generally cooled to about 25° C. and the polymer water-on-oil emulsion recovered. Unreacted monomer(s) may first be removed from the emulsion if desired or necessary; such as by stripping with the use of an increased nitrogen flow.

The resulting polymer water-in-oil emulsion generally comprises:

(a) an aqueous phase comprising from about 50 to about 80 preferably from about 60 to about 78, weight percent of the total emulsion and containing therein from about 20 to about 80, preferably from about 25 to about 60, weight percent of polymer, based on the total weight of aqueous phase;

(b) a hydrophobic liquid constituting from about 15 to about 50, preferably from about 20 to about 40, weight percent of the total emulsion, and (c) an oil-soluble surfactant constituting from about 0.1 to about 5, preferably from about 1 to about 3, weight percent of the total emulsion.

After the polymer water-in-oil emulsion is prepared, a water-soluble inverting surfactant may be added thereto. The surfactants which may be used include polyoxyethylene alkyl phenol; polyoxyethylene (10 mole) cetyl ether; polyoxyethylene alkyl-aryl ether; quaternary ammonium derivatives; potassium oleate; N-cetyl-N-ethyl morpholinium ethosulfate; sodium lauryl sulfate; condensation products of higher fatty alcohols with ethylene oxide, such as the reaction product of oleyl alcohol with 10 ethylene oxide units; condensation products of alkylphenols and ethylene oxide, such as the reaction products of isooctylphenol with 12 ethylene oxide units; condensation products of higher fatty acid amines with five, or more, ethylene oxide units; ethylene oxide condensation products of polyhydric alcohol partial higher fatty esters, and their inner anhydrides (e.g., mannitol anhydride, called Mannitan, and sorbitol-anhydride, called Sorbitan). The preferred surfactants are ethoxylated nonyl phenols (e.g., available from Union Carbide Corporation under its trademark TERGITOL NP-10), ethoxylated nonyl phenyl formaldehyde resins, and the like.

The inverting surfactant may be used in amounts of from about 0.1 to about 20, preferably from about 1 to about 10, parts by weight per one hundred parts by weight of the polymer.

The water-in-oil emulsion containing the inverting surfactant is inverted in the presence of water releasing the polymer into the water in a very short period of time.

The solubilized polymer may then be used, for example, as a flocculant in treating mineral processing streams such as phosphate slimes or coal blackwater suspensions. For use as a flocculant, the water solution may contain from about 0.001 to about 0.3, preferably from about 0.01 to about 0.1, weight percent polymer.

The present invention may be employed to prepare many kinds of anionic, cationic or amphoteric polymers, for example, polymers similar or identical to those described in commonly-assigned, copending U.S. patent application Ser. No. 302,100, filed Sept. 14, 1981, now U.S. Pat. No. 4,529,782, the disclosure of which is hereby expressly incorporated herein by reference. Those polymers are preferably of the following general formula:

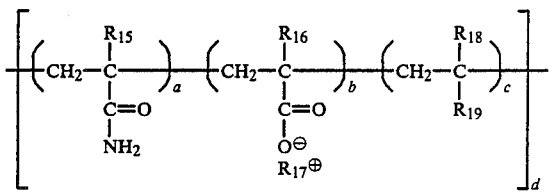

wherein $R_{15}$, $R_{16}$ and $R_{18}$ are independently hydrogen or methyl; $R_{17}^+$ is an alkali metal ion, such as $Na^+$ or $K^{30}$, or an ammonium group; $R_{19}$ is $-OR_{20}$ (where $R_{20}$ is an alkyl group having up to 5 carbon atoms),

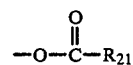

(where $R_{21}$ is either methyl or ethyl),

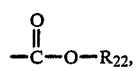

(where $R_{22}$ is an alkyl group having up to 8 carbon atoms), phenyl, methylsubstituted phenyl, CN, or

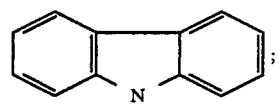

wherein a is from about 5 to about 90 mole percent, preferably from about 30 to about 60 mole percent, b is from about 5 to about 90, preferably from about 30 to about 60 mole percent, c is from 0 to about 20 mole percent, preferably from about 1 to about 10 mole percent, with the proviso that a+b+c equals 100 mole percent, and d is an integer of from about 1,000 to about 500,000. Under certain conditions, the alkoxy or acyloxy groups in the polymer may be partially hydrolyzed to the corresponding alcohol group and yield a polymer of the following general formula:

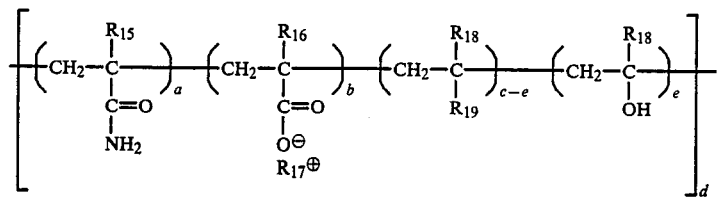

wherein $R_{15}$, $R_{16}$, $R_{17}^+$, $R_{18}$, $R_{19}$, a, b, c and d are as previously defined and e is from 0 to less than about 20 mole percent and wherein $a+b+(c-e)+e=100$ mole %.

Among the most preferred polymers which may be prepared by the process of the present invention are terpolymers of the following formula:

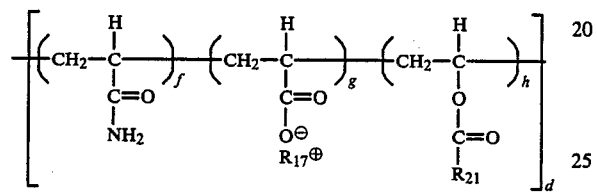

wherein $R_{17}^+$ is $Na^+$ or $K^+$ or $NH_4^+$, $R_{21}$ is methyl, ethyl or butyl, and f is from about 5 to about 90, preferably from about 30 to about 60 mole percent, g is from about 5 to 90, preferably from about 30 to 60 mole percent, h is from 0 to about 20 mole percent, with the proviso that $f+g+h$ equals 100 mole percent and d is as previously defined.

Among the preferred polymers which may be prepared by the process of the present invention are polymers of the following formula:

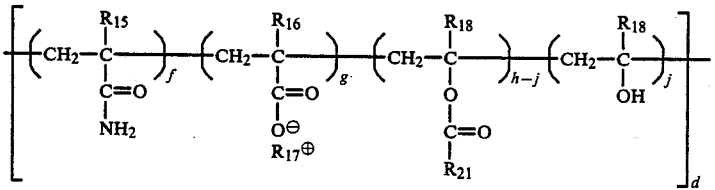

wherein $R_{15}$, $R_{16}$, $R_{17}^+$, $R_{18}$, $R_{21}$, f, g, h, d and e are as previously defined.

For purposes of the present invention, another type of preferred polymers are similar or identical to those disclosed in commonly-assigned, copending U.S. patent application Ser. No. 474,602, filed Mar. 11, 1983, now abandoned and refiled Sept. 18, 1985 as U.S. application Ser. No. 777,458, now U.S. Pat. No. 4,599,390, the disclosure of which is hereby expressly incorporated herein by reference. Those polymers are preferably of the following general formula:

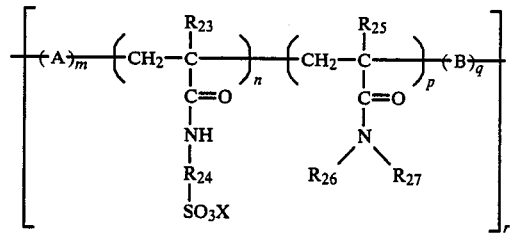

wherein A represents a repeating unit derived from a hydrophobic vinyl monomer having a water-solubility of less than about 5 weight %; $R_{23}$ and $R_{25}$ are each independently a hydrogen atom or a methyl group; $R_{26}$ and $R_{27}$ are each independently a hydrogen atom, a methyl group or an ethyl group; $R_{24}$ represents a divalent hydrocarbon group having from 2 to 13 carbon atoms; X represents a monovalent cation; B represents a repeating unit derived from an ethylenically-unsaturated carboxylic acid or a salt thereof; m is from 0 to about 10 mole %, n is from about 1 to about 40 mole %, p is from about 20 to about 98.9 mole %, and q is from 0 to about 40 mole %, with the proviso that $m+n+p+q=100$ mole %; and r is a large positive integer (e.g., such that the polymer molecular weight is greater than 500,000, preferably greater than 1,000,000).

Among the preferred polymers which may be prepared by the process of the present invention are terpolymers represented by the following formula:

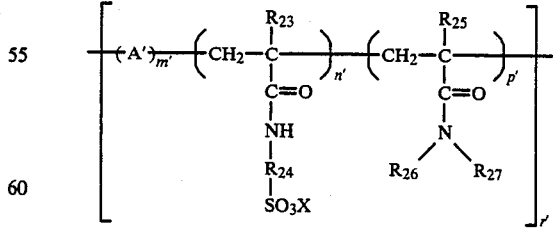

wherein
(1) A' represents a repeating unit derived from a hydrophobic vinyl monomer having a water-solubility of less than about 5 weight percent such as monomeric repeating units represented by the formula

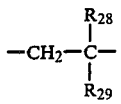

wherein $R_{28}$ is —H or —$CH_3$; $R_{29}$ is

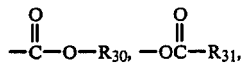

a halogen atom (e.g., chlorine), —O—$R_{32}$, —CN or

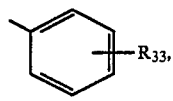

wherein $R_{30}$ is an alkyl group having from 1 to 12 carbon atoms, preferably from 1 to 4 carbon atoms, most preferably a butyl group, $R_{31}$ is an alkyl group having from 1 to 4 carbon atoms, preferably a methyl group; $R_{32}$ is an alkyl group having from 1 to 6 carbon atoms, preferably 2 to 4 carbon atoms; and $R_{33}$ is a hydrogen atom, a methyl group or an ethyl group, preferably a hydrogen atom or a methyl group. Examples of preferred hydrophobic vinyl monomers include vinyl acetate, styrene, acrylonitrile, alpha-methyl styrene, ethyl acrylate, methyl acrylate, ethyl methacrylate, methyl methacrylate, butyl acrylate, isobutyl acrylate, dodecyl acrylate, 2-ethylhexylacrylate, vinyl propionate, vinyl butyrate, propyl vinyl ether, butyl vinyl ether, isobutyl vinyl ether, vinyl chloride, vinylidene chloride, etc.

(2) $R_{23}$ to $R_{25}$ are each a hydrogen atom or a methyl group although it is preferred that both be a hydrogen atom;

(3) $R_{24}$ is a divalent hydrocarbon group having from 2 to 13 carbon atoms, such as alkylene groups having from 2 to 8 carbon atoms, cycloalkylene groups having from 6 to 8 carbon atoms, phenylene, and the like. Preferred divalent hydrocarbon groups include —$C(CH_3)_2$ —$CH_2$—,

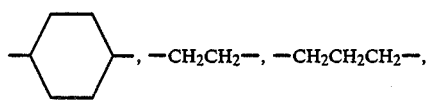

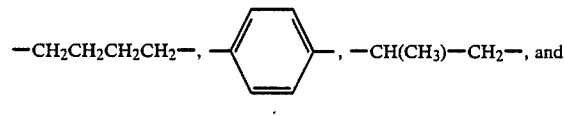

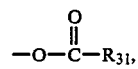

The most preferred $R_{24}$ grouping is —$C(CH_3)_2$—$CH_2$— which forms sodium "AMPS" when $R_{23}$=hydrogen and X is sodium;

(4) X is a monovalent cation such as a hydrogen atom, an ammonium group, and organoammonium group, an alkali metal atom (e.g., Na or K), and the like. The most preferred cation is a sodium atom;

(5) $R_{26}$ and $R_{27}$ are each a hydrogen atom, a methyl group or an ethyl group although it is preferred that both be hydrogen atoms;

(6) m' is from 0 to about 10 mole %, preferably from about 0.2 to 5 mole %;

(7) n' is from about 1 to about 40 mole %, preferably from about 5 to about 20 mole %;

(8) p' is from about 50 to about 98.9 mole %, preferably from about 75 to about 95 mole %;

(9) m'+n'+p'=100 mole %; and

(10) r' is a large positive integer to provide a polymer molecular weight of greater than 500,000 and preferably greater than 1,000,000.

Some of the acetoxy or alkoxy groups of $R_{29}$ (i.e., the $$-O-\overset{O}{\overset{\|}{C}}-R_{31},$$

or —O—$R_{32}$ groups, respectively) may be hydrolyzed, resulting in a tetrapolymer which may be represented by the formula:

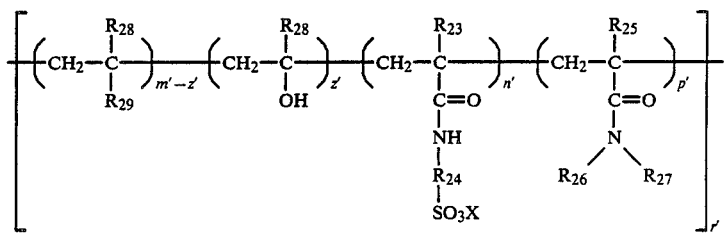

wherein $R_{23}$, $R_{24}$, $R_{25}$, $R_{26}$, $R_{27}$, $R_{28}$, $R_{29}$, X, m', n', p' and r' are as defined above, and z' is from 0 to less than about 10 mole % and wherein (m'−z')+z'+n'+p'=100 mole %.

Alternatively, instead of defining the terpolymer repeating units as in (6)-(8) above, the terpolymer and its hydrolyzed derivative may be defined as that resulting from the polymerization of a water-in-oil monomer emulsion containing from 0 to about 20 mole %, preferably from 0 to about 10 mole % of monomer A', from about 1 to about 40 mole %, preferably from about 5 to about 20 mole %, of the $SO_3X$— containing monomer, and from about 50 to about 98.9 mole %, preferably from about 75 to about 95 mole %, of monomer

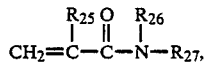

all based on the total moles of monomer in the emulsion.

A particularly preferred terpolymer is that resulting from the polymerization of a water-in-oil monomer emulsion containing from about 8 to about 12 mole % of sodium "AMPS" monomer, from about 87 to about 91 mole % of acrylamide monomer, and from about 1 to about 5 mole % of vinyl acetate monomer. These terpolymers are especially useful in flocculating phosphate slimes.

Also among the polymers similar to those disclosed in the above-identified copending application Ser. No. 474,602 and which may be made by the process of the invention are tetrapolymers of the following formula:

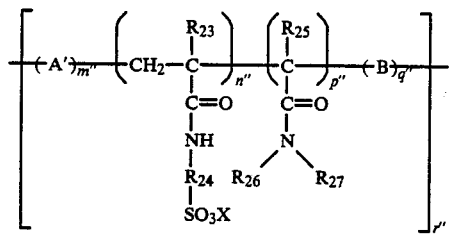

wherein A', $R_{23}$, $R_{24}$, $R_{25}$, $R_{26}$ and $R_{27}$ have the same meaning as above; wherein m", n", and r" have the same meaning as m', n', and r', respectively, defined above; and wherein (1) p" is from about 20 to about 96.9 mole %, preferably from about 40 to about 86.9 mole %;

(2) q" is greater than 0 and up to about 40 mole %, preferably from about 10 to about 30 mole %;

(3) B represents a repeating unit derived from an ethylenically-unsaturated monomer containing a carboxylic acid group such as acrylic acid, methacrylic acid, maleic acid, and the like, and salts thereof with alkali metals (e.g., sodium, potassium, etc.), ammonia (i.e., ammonium salts) and organic amines (e.g., ammonium salts represented by the formula $(R_{34})$ $(R_{35})$ $(R_{36})$ NH+ wherein $R_{34}$, $R_{35}$ and $R_{36}$ are each a hydrogen atom, an alkyl group having from 1 to 3 carbon atoms, or a hydroxyalkyl group having from 1 to 3 carbon atoms, such as a trimethylammonium group, a triethanolammonium group, etc.). The preferred B monomer is sodium acrylate.

Some of the acetoxy or alkoxy groups of the hydrophobic monomer A' may be hydrolyzed, resulting in a pentapolymer which may be represented by the formula:

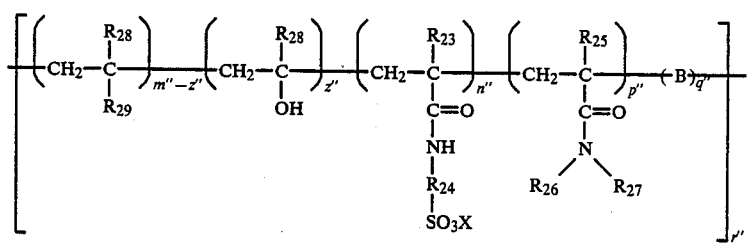

wherein $R_{23}$, $R_{24}$, $R_{25}$, $R_{26}$, $R_{27}$, $R_{28}$, $R_{29}$, X, B, m", n", p" and r" are as defined above, and z" is from 0 to less than about 10 mole % and wherein $(m"-z")+z"+n"+p"=100$ mole %;

Alternatively, instead of defining the tetrapolymer repeating units as above, the tetrapolymer (and its hydrolyzed derivative) may be defined as that resulting from the polymerization of a water-in-oil monomer emulsion containing from 0 to about 20 mole %, preferably from 0 to about 10 mole % of monomer A', from about 1 to about 40 mole %, preferably from about 5 to about 20 mole %, of the SO$_3$X-containing monomer, from about 20 to about 96.9 mole %, preferably from about 40 to about 86.9 mole %, of monomer

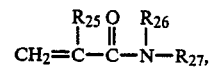

and greater than 0 to about 40 mole %, preferably from about 10 to about 30 mole %, of monomer "B", all based on the total moles of monomer in the emulsion.

A particularly preferred tetrapolymer is that resulting from the polymerization of a water-in-oil monomer emulsion containing from about 50 to about 70 mole % of acrylamide monomer, from about 6 to about 10 mole % of sodium "AMPS" monomer, from about 1 to about 5 mole % vinyl acetate monomer and from about 20 to about 40 mole % of sodium acrylate monomer. Such tetrapolymers are especially useful in the flocculation of coal blackwater suspensions.

Other polymers which may be prepared by the process of the present invention may be represented by the general formula:

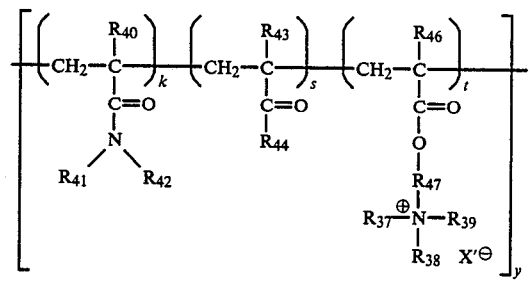

wherein $R_{40}$ represents either a hydrogen atom or a methyl group; $R_{41}$ and $R_{42}$ are each independently selected from a hydrogen atom, a methyl group and an ethyl group; $R_{43}$ is a hydrogen atom or a methyl group; $R_{44}$ represents —O$R_{45}$ or —$R_9$—SO$_3$X, wherein $R_{45}$ represents a hydrogen atom, an alkali metal atom (e.g. sodium, potassium) an ammonium group or an organoammonium group of the formula $(R_{37})$ $(R_{38})$ $(R_{39})$ NH+ (wherein $R_{37}$, $R_{38}$ and $R_{39}$ are as described hereinabove), $R_9$ is the same as $R_9$ defined above, and X represents a monovalent cation such as a hydrogen atom, an alkali metal atom (e.g. sodium, potassium), an ammonium group or an organoammonium group of the formula $(R_{37})$ $(R_{38})$ $(R_{39})$ NH+ (wherein $R_{37}$, $R_{38}$ and $R_{39}$ are as defined above); $R_{46}$ is a hydrogen atom or a methyl group; $R_{47}$ represents a divalent alkylene group having from 1 to 3 carbon atoms; $R_{37}$ $R_{38}$ and $R_{39}$ are the same as defined above; and X' represents a halogen atom (e.g., chlorine) or $R_{48}SO_4$ wherein $R_{48}$ is an alkyl group having from 1 to 4 carbon atoms; k is from about 20 to about 98.9 mole percent; s and t are each from about 1 to about 10 mole percent or alternatively s is 0 and t from about 1 to about 20 mole percent and where s is greater than 0, t is at least as large as s; and y is a large positive integer to provide a polymer having a molecular weight greater than 100,000.

Another type of polymer which may be prepared by the process of the present invention may be represented by the following general formula:

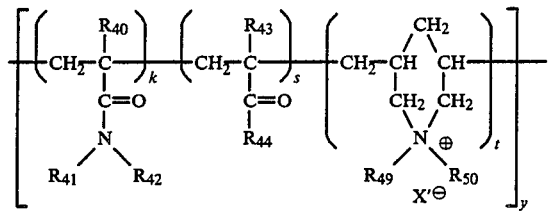

wherein $R_{40}$, $R_{41}$, $R_{42}$, $R_{43}$ $R_{44}$, $R_{45}$, X', k, s, t and y are the same as defined above; and $R_{49}$ and $R_{50}$ are the same as $R_{37}$, $R_{38}$ and $R_{30}$ defined above. It is to be understood that in this general formula, as in the immediately preceding general formula, s may be 0 and t may be from about 1 to about 20 mole percent of the polymer and where s is greater than 0, t is at least as large as s. In both of these instances, the net charge of the polymer will be cationic in nature whereas if s and t are present in equal molar portions, the net polymer charge will be neutral. Similarly, where s is greater than t, the resulting net polymer will be anionic. The above N-hetero repeating group is $C_6H_{10}NR_{49}R_{50}X'$ (i.e., pyrrolidinium or piperidinium).

The present invention is illustrated, sometimes by comparison with prior art processes, by the following examples which describe work that was actually performed. These examples are meant to be illustrative only and are not intended to limit the invention thereby; rather, it is the intention that the invention be limited only by the scope of the claims appended hereto.

The intrinsic viscosities (I.V.) of the polymers were determined by forming an 0.3 weight % solution of the polymer in a 1N sodium chloride solution to make 0.5 weight percent, 0.25 weight percent and 0.125 weight percent polymer solutions. Using a Cannon-Ubbelohde viscometer, the reduced viscosities at different polymer concentrations were measured at 25° C. and those reduced viscosities were plotted against the solution polymer concentrations. The intrinsic viscosity (IV) is taken as the viscosity at zero concentration.

EXAMPLE 1

This Example illustrates the fact that a monomer water-in-oil emulsion becomes shear-stable after a small amount of polymer is formed therein. Specifically, an acrylamide/sodium acrylate/vinyl acetate monomer water-in-oil emulsion was prepared as follows:

An aqueous solution was prepared by first neutralizing 11.3 parts of acrylic acid in 13.2 parts of distilled water with 15.8 parts of a 40% caustic solution. The resulting acrylate solution was then combined with another aqueous solution consisting of 14.7 parts of acrylamide crystals, 0.004 part EDTA and 18 parts of distilled water. An oil solution was prepared by mixing 24.2 parts of Isopar M, 1.3 parts of Span 80 and 1.5 parts of vinyl acetate. The two solutions were used for the following experiments:

Appropriate portions of the above solutions were emulsified at different speeds in a Waring Blender to create different shear rate conditions and their viscosities were measured after mixing for 3 minutes at each speed using a Brookfield Viscometer (Model HBT, Spindle No. 1 at 25° C. and 10 rpm). The data obtained are shown in FIG. 3, curve a, of the drawings.

The remaining portions of the above solutions were emulsified to give a water-in-oil emulsion. One thousand grams of the monomer emulsion was charged into a reaction vessel equipped with a turbine agitator, nitrogen (air) inlet and outlet, addition funnel, condensor, a thermometer and an external bath used for either heating or cooling purposes.

The emulsion was degassed by sparging with nitrogen for 30 minutes at a rate of 650 cubic centimeters per minute. 20 percent of a polymerization initiator solution of 0.24 gram of VAZO 52 in 13.1 grams of toluene was then added and the nitrogen degassing was continued for an additional 15 minutes. Agitation was commenced at a rate of 650 rpm. The reaction temperatures varied with time as follows:

| Elapsed Time (Minutes) | Reaction Temperature (°C.) |
|---|---|
| 0 | 23 |
| 30 | 24 |
| 45 | 24 |
| 50 | 34 |
| 55 | 39 |
| 60 | 44 |
| 65 | 47 |
| 67 | 48.5 |
| 70 | 49.5 |
| 75 | 50.5 |
| 78 | 51.5 |
| 80 | 52 |
| 85 | 51.5 |
| 88 | 53 |
| 90 | 52.5 |
| 93 | 52 |

At each of 65 minutes, 75 minutes and 85 minutes elapsed time, an additional 1.5 milliliters of the polymerization initiator solution was added. The reaction was stopped after 93 minutes with air injection and by immersing the reactor in a ice/water bath. About one-half of the reaction mixture was removed and 5 grams of an antioxidant solution (i.e., 0.2 gram of thiobisphenol, avialable from Monsanto under its trade name Santonox-R in 4 grams of toluene) was added to this portion. It was determined by coagulation in isopropanol that the removed portion had about 1.3 percent polymer conversion. The viscosities of this portion were measured at different Waring Blender speeds and the results are shown in FIG. 3, in curve b.

The reaction was continued with the remainder of the reaction mixture for an additional period of time and the reaction temperature was controlled as follows:

| Elapsed Time (Minutes) | Reaction Temperature (°C.) |
|---|---|
| 0 | 41 |
| 3 | 43 |
| 8 | 45 |
| 13 | 47 |
| 18 | 50 |

-continued

| Elapsed Time (Minutes) | Reaction Temperature (°C.) |
|---|---|
| 21 | 51 |
| 23 | 52 |
| 28 | 54 |
| 33 | 54 |
| 34 | 55 |

At each of the elapsed times of 13, 23 and 33 minutes, an additional 1.5 milliliters of the polymerization initiator solution was added. At the end of 34 minutes of additional elapsed time, the reaction was stopped by air injection and by the addition of Santonox-R inhibitor in the same manner as before. It was determined by the coagulation test that this portion of the reaction mixture was at about 58.9 percent polymer conversion. The viscosities of this portion were also measured at different Waring Blender speeds and the results are shown in FIG. 3, in curve c. FIG. 3, curve d, illustrates the viscosities of the final product of a batch produced from an identical monomer emulsion formulation. The blending time at each particular speed was 3 minutes. Based upon the results as shown in FIG. 3, it is seen that the original monomer emulsion is highly sensitive to the shear rate but significantly, once a small amount of polymer conversion has taken place, the emulsion becomes essentially resistant to shear.

EXAMPLE 2 (PRIOR ART)

Into a five-gallon, jacketed, stainless steel reactor, equipped with a straight blade turbine agitator and a circulating loop equipped with a centrifugal pump (ECO Model C-5D) and a heat exchanger (i.e., an American Standard SSCF 47113012A25 heat exchanger with ¼ inch tubes and 1.2 square feet of heat transfer area), was charged 13.95 pounds of deionized water and 4.57 pounds of acrylic acid, with agitation. To the resulting solution was slowly added with cooling about 5.1 pounds of a 50% sodium hydroxide solution, titrating to a pH of 7.63. Thereafter, 5.31 pounds of crystalline acrylamide and 0.76 gram of sodium ethylene diamine tetraacetate is added. Following that addition, and once the agitation was stopped and the aqueous phase quiescent, a mixture of 8.78 pounds of an aliphatic hydrocarbon (i.e., available from Exxon Chemical Company under its trademark ISOPAR M), 225 grams of sorbitan monooleate (i.e., available from I.C.I. under its tradename SPAN 80) and 247 grams of vinyl acetate was added and the agitation was then restarted at high speed to form a monomer water-in-oil emulsion. The reactor was then sparged with nitrogen at a rate of 5 SCFH for 105 minutes. Circulation of the emulsion through the circulating loop was started at a pump speed to give about 8 pounds per minute flow rate. About 20% of a solution of 4.47 grams of 2,2'-azobis-(2,4-dimethylvaleronitrile) (i.e., available from E. I. du Pont de Nemours & Co. under its trademark VAZO 52) in 152.5 grams of toluene was added and the reactor was heated to 52° C. and controlled to 52° C.±2° C. Agitation was maintained throughout the course of the reaction and the remaining initiator solution (i.e., the VAZO 52 solution) was added incrementally over a period of about 4 hours. Throughout that time, the emulsion was pumped through the circulating loop heat exchanger to cool the emulsion during the polymerization process. An ethylene glycol water solution at a temperature of 5° C. was employed as the coolant in the heat exchanger. At the conclusion of the polymerization, the reactor was cooled to 30° C. The I.V. of the polymer thus produced was 23.1 dl-g.

However, the product emulsion contained many gel bodies and was incapable of being filtered through cheesecloth.

EXAMPLE 3 (PRIOR ART)

Example 2 was repeated except that a pump speed sufficient to give a flow rate of about 18 pounds per minute was employed for the circulating pump. The entire batch gelled and no product was obtained.

EXAMPLE 4

This example reflects the use of the dual-initiator process to obtain a shear-stable emulsion. The procedure of Example 2 was followed, except that prior to the beginning of the polymerization, 0.2 gram of a first initiator, 2,2'-azobis-(2,4-dimethyl-4-methoxy valeronitrile) (i.e., obtained from E. I. du Pont de Nemours & Co. under its trademark VAZO 33) in 12 grams of toluene, was added to the emulsion; the emulsion was circulated through the cooling loop at about 8 gallons per minute; and 63 grams of a solution of 4.47 grams of VAZO 52 in 152.5 grams of toluene was added when the temperature reached 52° C., with the balance being added incrementally over the course of the polymerization.

A polymer having an I.V. of 26.7 dl-g was obtained with no noticeable gel formation.

EXAMPLE 5

The procedure of Example 4 was followed except that the emulsion was simply pumped through the heat exchanger without supplying coolant thereto. A polymer having an I.V. of 28.7 dl-g was obtained with no noticeable gel formation.

EXAMPLE 6

The procedure of Example 4 was repeated and a polymer having an I.V. of 20.3 dl-g was obtained with no noticeable gel formation.

EXAMPLE 7 (PRIOR ART)

The procedure of Example 2 was followed except that instead of the centrifugal pump used in Example 2, a Viking Model H-7124 pump was used (which provides a flow rate of about 16 gallons per minute) in the circulating loop. The emulsion gelled and no useful product was obtained.

EXAMPLE 8 (PRIOR ART)

The procedure of Example 7 was repeated with the same result: the emulsion gelled and no usable product was obtained.

EXAMPLE 9

The procedure of Example 4 was repeated except that the Viking pump of Example 7 was used instead of the centrifugal pump used in Example 4. There was no noticeable gel formation, the emulsion was filtered through cheesecloth and a polymer having an I.V. of 28.1 dl-g was obtained.

EXAMPLE 10

The procedure of Example 4 was repeated using the same pump as in Example 4 at a speed setting of 5. A polymer having an I.V. of 30.9 dl-g was obtained with no noticeable gel formation.

EXAMPLE 11 (PRIOR ART)

The procedure of Example 2 was repeated except that a different pump was employed; specifically, an ECO Model C-10 centrifugal pump. This pump was employed to provide a flow rate in the circulating loop of about 40 pounds per minute. A polymer having an I.V. of 27.8 dl-g was obtained with no noticeable gel formation.

EXAMPLE 12 (PRIOR ART)

The procedure of Example 11 was followed using the same circulation rate. The emulsion was gelled and no useful product was obtained.

EXAMPLE 13 (PRIOR ART)

Into a glass-lined, 500-gallon reactor, equipped with a turbine agitator, heating and cooling jacket, air (nitrogen) inlet and outlet, temperature control instruments, and a dissolved oxygen meter, there was charged 547.9 pounds of deionized water, 197.5 pounds of acrylic acid, and about 278 pounds of a 40% sodium hydroxide solution. The reaction mixture was kept at or below 25° C. during the course of neutralization. Thereafter, 256.7 pounds of acrylamide crystals and 0.077 pound of ethylenediamine tetraacetic acid (EDTA) were introduced. In a separate 100-gallon vessel, an oil solution was prepared by mixing 423.9 pounds of Isopar M, 23.7 pounds of Span 80 and 26.5 pounds of vinyl acetate monomer. The oil solution was pumped into the 500-gallon reactor, and a water-in-oil emulsion was generated by high-speed mixing. The monomer emulsion was subsequently deaerated by nitrogen sparging.

The deaerated monomer emulsion was heated through the heating jacket. When the reaction temperature reached 30° C., an initiator solution consisting of 0.48 pound of VAZO-52 in 23.07 pounds of toluene was fed into the reactor at an initial rate of 7.1 pounds of solution per hour. The polymerization was maintained at 52±2° C. by controlling the rate of initiator feed, jacket cooling, and intermittent air sparging. When the polymerization was complete, the reactor was allowed to cool down to room temperature and a solution consisting of 0.49 pound of Santonox-R and 11.31 pounds of toluene was added. The product was then discharged through a filter to remove any agglomerated particles or gels. The reaction was repeated three additional times and in all cases there were some gels found on the surface of the agitator, sparging tubes, and reactor wall. The total amount of gel in each run was collected, weighed, and recorded. The results are shown below in Table III.

| Run | Intrinsic Viscosity* (dl/g) | Total Gel Content (weight % of product) |
| --- | --- | --- |
| 1 | 7.5 | 61 |
| 2 | 21.17 | 3.8 |
| 3 | 17.0 | 5.4 |
| 4 | 19.2 | 1 |

*measured in 1N sodium chloride solution

EXAMPLE 14 (PRIOR ART)

Into a 60-gallon stainless steel reactor, equipped with a turbine agitator, heating or cooling jacket, nitrogen (air) inlet and outlet, temperature control instruments, and initiator and monomer emulsion feeding tubes, there was charged 31.87 pounds of acrylic acid, 125 pounds of deionized water, and about 44.2 pounds of a 40% aqueous sodium hydroxide solution. The reaction mixture was kept below or at 25° C. during the entire course of the neutralization. Thereafter, 52.58 pounds of crystalline acrylamide and 0.015 pound of EDTA were introduced. In a separate stainless pot, an oil solution was prepared by mixing 86.67 pounds of Isopar M, 4.88 pounds of Span 80, and 17 pounds of ethyl acrylate. The oil solution was introduced into the reactor and a gentle mixing was applied to generate a crude water-in-oil emulsion. The latter was pumped through an in-line Morton-Gaulin Model 100-KLB-885 Homogenizer to yield a much finer particle size emulsion. The fine monomer emulsion was stored in a vertical tank, equipped with a circulating loop for mixing purposes, where it was deaerated through nitrogen sparging.

Once the deaeration was complete, 96 pounds of the deaerated monomer emulsion was transferred back to the 60-gallon reactor under a nitrogen blanket. An initiator solution composed of 0.2 pound of 2,2'-azobis-(isobutyronitrile) (available from E. I. Du Pont de Nemours & Co. under its trademark VAZO-64) and 4 pounds of toluene was prepared. The monomer emulsion was heated up using the heating jacket, and 1 pound of the initiator solution was introduced when the reaction temperature reached 40° C. When the reaction temperature reached 55°±2° C. the rest of the monomer emulsion was fed continuously into the reactor at a rate of about 66.5 pounds/hour. At the same time, the remaining initiator solution was also fed into the reactor at a rate of about 1 pound/hour. The polymerization temperature was controlled by controlling the rates of feeding monomer emulsion and the initiator solution and by cooling and occasional air sparging. At the end of the polymerization, the reactor was cooled to room temperature and a solution consisting of 0.2 pound of Santonox-R in 3.35 pounds of toluene was added. The product was discharged through a paint filter and the amount of gels collected, weighed, and recorded. The reaction was repeated eight times, the last five of which used ethyl acrylate instead of vinyl acetate.

In all cases, from relatively small to substantial amounts of gels were found in the product. The results are shown in Table IV below:

| Run | Hydrophobic Monomer* | Intrinsic Viscosity** (dl/g) | Total Gel Content (weight % of product |
| --- | --- | --- | --- |
| 1 | VAc | 13.7 | 1.2 |
| 2 | VAc | 19.9 | 14 |
| 3 | VAc | 16.6 | 2.2 |
| 4 | VAc | 16.6 | 1.2 |
| 5 | EA | — | 32 |
| 6 | EA | 13.3 | 1.6 |
| 7 | EA | 13.5 | 20 |
| 8 | EA | 13.3 | 2 |
| 9 | EA | 16.4 | 15 |

*VAc = vinyl acetate; EA = ethyl acrylate
**measured in 1N sodium chloride solution

EXAMPLE 15

Into 229.13 grams of deionized water was charged 34.16 grams of 2-acrylamido-2-methylpropanesulfonic acid ("AMPS") crystals, 58.45 grams of dimethylamino ethyl methacrylate dimethyl sulfate salt (i.e., Sipomer Q5-80, obtained from Alcolac), 187.64 grams of a 50 weight percent aqueous solution of acrylamide. Separately, an oil phase was prepared by mixing 165.58 grams of Isopar M and 9.46 grams of Span-80. The two phases were combined and homogenized in a Waring Blender to yield a uniform water-in-oil emulsion having a Brookfield viscosity of 1,310 centipoises (Model HBT, at 10 rpm and 25° C. The monomer emulsion was then transferred to a one-liter Pyrex glass polymerization kettle equipped with a turbine agitator, a thermometer, a condenser, an addition funnel and a nitrogen (air) inlet and outlet. The reactor was deaerated by sparging with nitrogen for about 27 minutes at the rate of 400 cubic centimeters per minute. Thereafter, a solution of 0.01 gram of VAZ0 33 in 1.50 grams of xylene was added. The temperature of the emulsion was 25° C. Heating was then started and the temperature increased to about 49° C. after about 19 minutes, at which point 20% of a solution of 0.148 gram of VAZO 52 in 7.51 grams of xylene was added. The balance of the VAZO 52 solution was added incrementally over the next 40 minutes. The temperature was maintained between 48° and 51° C. The polymerization was completed in about 4 hours and a solution of 0.164 gram of Santonox-R in 5 grams of xylene was added and the reaction mixture cooled to room temperature.

Its intrinsic viscosity (measured in 1N sodium chloride solution) was 4.8 dl/g; and the net charge of the polymer was neutral.

EXAMPLE 16

Example 15 was repeated except that the relative molar amounts of "AMPS"/Sipomer Q5-80/acrylamide was changed from 10/10/80 to 15/5/80. The 0.3 percent solution viscosity of the resulting polymer was 1,950 centipoises; the intrinsic viscosity of the polymer (measured in a 1N sodium chloride solution) was 5.0 dl/g; and the net charge of the polymer was anionic.

EXAMPLE 17

Example 15 was repeated except that the relative molar amount of "AMPS"/Sipomer Q5-80/acrylamide was changed to 5/15/80. The 0.3 percent solution viscosity of the resulting polymer was 2,200 centipoises; the intrinsic viscosity of the polymer (measured in a 1N sodium chloride solution) was 3.3 dl/g; and the net charge of the polymer was cationic.

What is claimed is:

1. A process for producing water-in-oil emulsions of a polymer from at least one ethylenically-unsaturated monomer comprising the steps of
   (a) forming an aqueous phase comprising an aqueous solution containing at least one ethylenically-unsaturated, water-soluble monomer;
   (b) forming an oil phase comprising a hydrophobic liquid and an oil-soluble surfactant;
   (c) blending said aqueous phase and oil phase to form a water-in-oil emulsion of said monomer;
   (d) initiating polymerization of said monomer in said emulsion by heating said emulsion in the presence of a first polymerization initiator capable of initiating polymerization of said monomer at a temperature less than about 45° C.;
   (e) after a small amount of polymer is initially formed sufficient to provide a shear-stable monomer emulsion, completing said polymerization in the presence of a second polymerization initiator capable of initiating polymerization of said monomer at a second temperature which is both higher than about 40° C. and higher than said first temperature; and
   (f) cooling said emulsion during said polymerization by continuously withdrawing at least a portion of said emulsion during said polymerization, circulating the withdrawn portion through an external heat exchanger and returning it to the reaction medium.

2. The process of claim 1 wherein said first initiator comprises a free-radical initiator capable of polymerizing said monomer at a temperature of from about 0° to about 45° C.

3. The process of claim 1 wherein said second initiator comprises a free-radical initiator capable of polymerizing said monomer at a temperature of from about 40° to about 100° C.

4. The process of claim 1 wherein said oil phase also contains at least one hydrophobic monomer having a water solubility of less than about 5 weight percent.

5. The process of claim 4 wherein said hydrophobic monomer is selected from the group consisting of vinyl esters, alkyl acrylates, alkyl methacrylates, vinyl ethers, acrylonitrile, styrene, N-vinyl carbazole, and vinyl halides.

6. The process of claim 1 wherein said monomer is selected from the group consisting of acrylic and methacrylic acids and salts thereof; acrylamide; methacrylamide; and acrylamido-and methacrylamido monomers of the formula

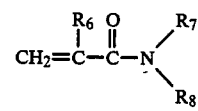

wherein $R_6$ is a hydrogen atom or a methyl group; $R_7$ is a hydrogen atom or an alkyl group having from 1 to 2 carbon atoms; $R_8$ is a hydrogen atom, an alkyl group having from 1 to 2 carbon atoms or $-R_9-SO_3X$ wherein $R_9$ is a divalent hydrocarbon group having from 1 to 13 carbon atoms and X is a monovalent cation.

7. The process of claim 1 wherein said hydrophobic liquid is selected from the group consisting of benzene, xylene, toluene, mineral oils, kerosenes, petroleum and mixtures thereof.

8. The process of claim 1 wherein said oil-soluble surfactant has a Hydrophile-Lipophile Balance (HLB) of from about 1 to about 10.

9. The process of claim 1 wherein said second temperature is higher than said first temperature by at least about 5° C.

10. The process of claim 1 wherein said first initiator attains a half-life at a temperature which is at least about 10° C. less than the temperature at which said second initiator attains the same half-life.

11. The process of claim 1 wherein said polymer is represented by the following formula:

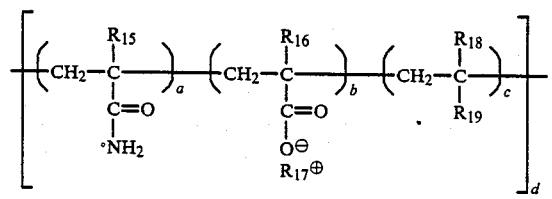

wherein $R_{15}$, $R_{16}$, and $R_{18}$ are independently each a hydrogen atom or a methyl group; $R_{17}^+$ is an alkali metal atom or an ammonium group, $R_{19}$ is $-OR_{20}$,

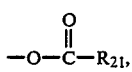

phenyl, substituted phenyl, —CN,

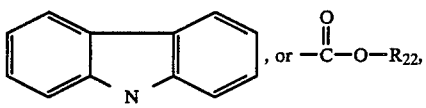 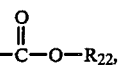

wherein $R_{20}$ is an alkyl group having up to 5 carbon atoms wherein $R_{21}$ is a methyl or ethyl group, and wherein $R_{22}$ is an alkyl group having up to 8 carbon atoms; a is from about 5 to about 90 mole %, b is from about 5 to about 90 mole %, c is from 0 to about 20 mole % with the proviso that $a+b+c=100$ mole %; and d is an integer of from about 1,000 to about 500,000.

12. The process of claim 11 wherein said polymer is a terpolymer represented by the formula;

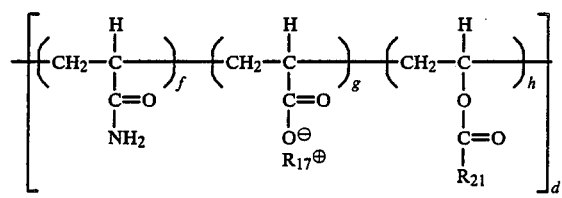

wherein $R_{17}+$ is $Na+$, or $K+$ or $NH_4+$; $R_{21}$ is a methyl, ethyl or butyl group; f is from about 30 to about 60 mole %, g is from about 30 to about 60 mole % and h is from 0 to about 20 mole %, with the proviso that $f+g+h=100$ mole %.

13. The process of claim 1 wherein said polymer is represented by the following formula:

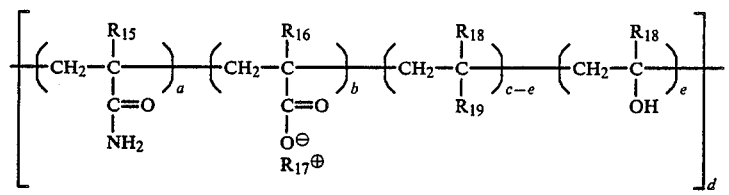

wherein $R_{15}$, $R_{16}$, $R_{17}^+$, $R_{18}$, $R_{19}$, a, b, c and d are as defined in claim 11; wherein e is from 0 to less than about 20 mole % and with the proviso $a+b+(c-e)+e=100$ mole %.

14. The process of claim 13 wherein said polymer is represented by the formula:

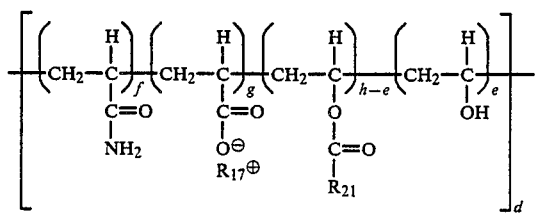

wherein $R_{17}$, $R_{21}$, f, g and h are as defined in claim 12; wherein e is from 0 to about 20 mole %, with the proviso that $f+g+(h-e)+e=100$ mole %.

15. The process of claim 1 wherein said polymer is represented by the formula

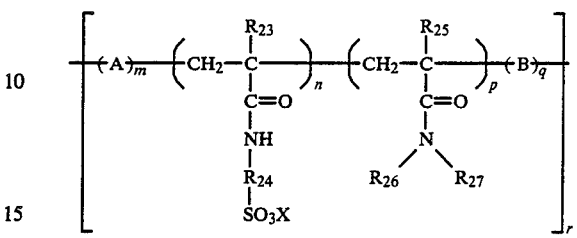

wherein A represents a repeating unit derived from a hydrophobic vinyl monomer having a water-solubility of less than about 5 weight percent; $R_{23}$ and $R_{25}$ are each a hydrogen atom or a methyl group; $R_{26}$ and $R_{27}$ are each independently a hydrogen atom, a methyl group or an ethyl group; $R_{24}$ represents a divalent hydrocarbon group having from 2 to 13 carbon atoms; X represents a monovalent cation; B represents a repeating unit derived from an ethylenically-unsaturated carboxylic acid or a salt thereof; m is 0 to about 10 mole %, n is from about 1 to about 40 mole %, p is from about 20 to about 98.9 mole % and q is 0 to about 40 mole %, with the proviso that $m+n+p+q=100$ mole %; and r is a large positive integer.

16. The process of claim 15 wherein said polymer is a terpolymer represented by the formula:

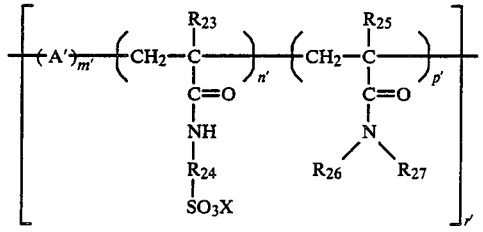

wherein A' represents

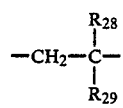

wherein $R_{28}$ is —H or —CH$_3$ and $R_{29}$ is

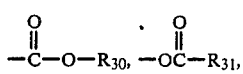

a halogen atom, $-O-R_{32}$, —CN or

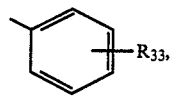

wherein $R_{30}$ is an alkyl group having from 1 to 12 carbon atoms, $R_{31}$ is an alkyl group having from 1 to 4 carbon atoms, $R_{32}$ is an alkyl group having from 1 to 6 carbon atoms, and $R_{33}$ is a hydrogen atom, a methyl group or an ethyl group; $R_{24}$ is an alkylene group having from 2 to 8 carbon atoms, a cycloalkylene group having from 6 to 8 carbon atoms or phenylene; X is a hydrogen atom, an ammonium group, an organoammonium group or an alkali metal atom, m' and n' are the same as m and n, respectively, and p' is from about 50 to 98.9 mole %, wherein m'+n'+p'=100 mole %; and wherein r' is a large positive integer such that the molecular weight of the polymer is greater than 500,000.

17. The process of claim 16 wherein said polymer is represented by the following formula:

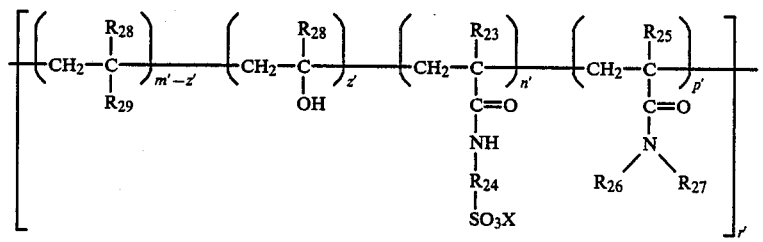

wherein $R_{23}$, $R_{24}$, $R_{25}$, $R_{26}$, $R_{27}$, $R_{28}$, $R_{29}$, X, m', n', p' and r' are as defined in claim 16, and wherein z' is from 0 to less than about 10 mole % and wherein (M'−z')+n'+p'+z'=100 mole %.

18. The process of claim 16 wherein said terpolymer comprises a polymer resulting from the polymerization of a water-in-oil monomer emulsion containing from about 8 to about 12 mole % sodium-2-acrylamido-2-methylpropane sulfonate monomer, from about 87 to about 91 mole % acrylamide monomer and from about 1 to about 5 mole % of vinyl acetate monomer.

19. The process of claim 15 wherein said polymer is a tetrapolymer represented by the formula:

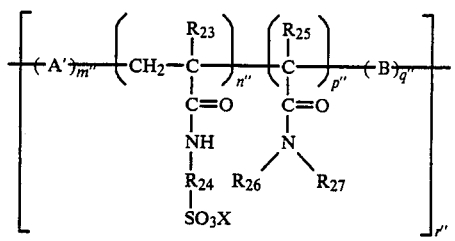

wherein A', $R_{23}$, $R_{24}$, $R_{25}$, $R_{26}$ and $R_{27}$ are as defined in claim 15; wherein m", n" and r" have the same meaning as m, n and r, respectively; wherein p" is from about 20 to 96.9 mole %; wherein q" is greater than 0 and up to about 40 mole %, with the proviso that m"+n"+p"+q"=100 mole %; and wherein B represents a repeating unit derived from a member selected from the group consisting of acrylic and methacrylic acids, maleic acid, and alkali metal salts thereof.

20. The process of claim 19 wherein said tetrapolymer is at least partially hydrolyzed and is represented by the following formula:

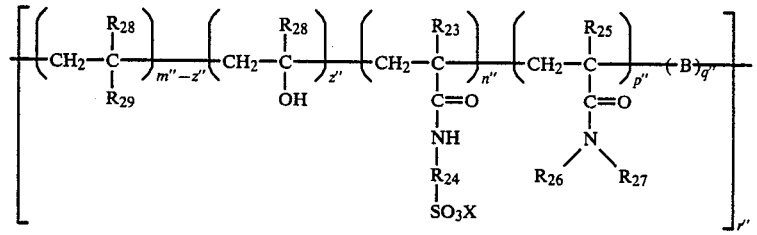

wherein $R_{23}$, $R_{24}$, $R_{25}$, $R_{26}$, $R_{27}$, $R_{28}$, $R_{29}$, X, B, m", n", p", q" and r" are as defined in claim 11, and wherein z" is from 0 to less than about 10 mole %, with the proviso that (m"−z")+n"+p"+q"+z"=100 mole %.

21. The process of claim 19 wherein said tetrapolymer comprises a polymer resulting from the polymerization of a water-in-oil monomer emulsion containing from about 6 to about 10 mole % of sodium-2-acrylamido-2-methylpropane sulfonate monomer, from about 50 to about 70 mole % of acrylamide monomer, from about 1 to about 5 mole % of vinyl acetate monomer and from about 20 to about 40 mole % of sodium acrylate monomer.

22. The process of claim 1 wherein said polymer is represented by the following formula:

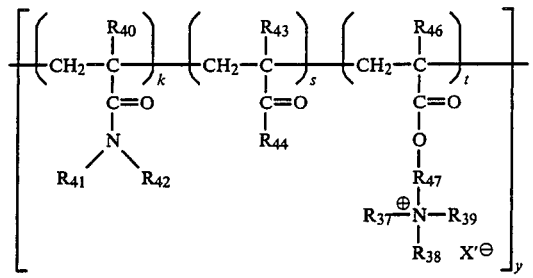

wherein R₄₀ is hydrogen or methyl; R₄₁ and R₄₂ are each selected from hydrogen, methyl and ethyl; R₄₃ is hydrogen or methyl; R₄₄ is —OR₄₅ or —R₉SO₃X, wherein R₄₅ is hydrogen, an alkali metal, an ammonium group or an organoammonium group of the formula (R₃₇) (R₃₈) (R₃₉) NH⁺ wherein R₃₇, R₃₈ and R₃₉ are each selected from hydrogen, alkyl having from 1 to 18 carbon atoms, aryl, hydroxyalkyl having from 1 to 3 atoms or mixtures thereof; R₉ is a divalent hydrocarbon having 1 to 13 carbon atoms, X is a monovalent cation; R₄₆ is hydrogen or methyl; R₄₇ is divalent alkylene having from 1 to 3 carbon atoms; X is halogen or R₄₈SO₄, wherein R₄₈ is alkyl having from 1 to 4 carbon atoms; k is from about 20 to about 98.9 mole percent; s and t are each from about 1 to about 10 mole percent or alternatively s is 0 and t is from about 1 to about 20 mole percent; and y is a large positive integer to provide a polymer having a molecular weight greater than 100,000.

23. The process of claim 1 wherein said polymer is represented by the following formula:

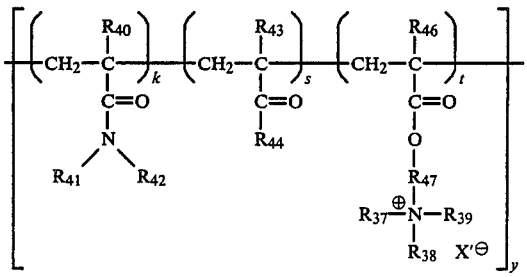

wherein R₄₀ is hydrogen or methyl; R₄₁ and R₄₂ are each selected from hydrogen, methyl and ethyl; R₄₃ is hydrogen or methyl; R₄₄ is —OR₄₅ or —R₉SO₃X, wherein R₄₅ is hydrogen, an alkali metal, an ammonium group or an organoammonium group of the formula (R₃₇) (R₃₈) (R₃₉) NH⁺ wherein R₃₇, R₃₈ and R₃₉ are each selected from hydrogen, alkyl having from 1 to 18 carbon atoms, aryl, hydroxyalkyl having from 1 to 3 atoms or mixtures thereof; R₉ is a divalent hydrocarbon having 1 to 13 carbon atoms, X is a monovalent cation; R₄₆ is hydrogen or methyl; R₄₇ is divalent alkylene having from 1 to 3 carbon atoms; X is hydrogen or R₄₈SO₄, wherein R₄₈ is alkyl having from 1 to 4 carbon atoms; k is from about 20 to about 98.9 mole percent; s and t are each from about 1 to about 10 mole percent and wherein s and t are the same; and y is a large positive integer to provide a polymer having a molecular weight greater than 100,000.

24. The process claim 9 wherein said polymer is represented by the formula:

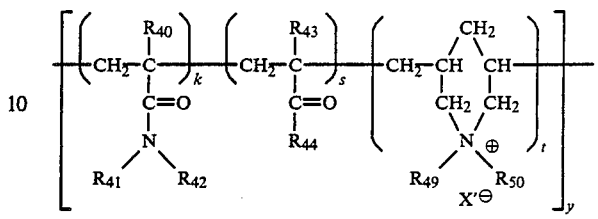

wherein R₄₀ is hydrogen or methyl; R₄₁ and R₄₂ are each selected from hydrogen, methyl and ethyl; R₄₃ is hydrogen or methyl; R₄₄ is —OR₄₅ or —R₉SO₃X, wherein R₄₅ is hydrogen, an alkali metal, an ammonium group or an organoammonium group of the formula (R₃₇) (R₃₈) (R₃₉) NH⁺ wherein R₃₇, R₃₈ and R₃₉ and R₄₉ and R₅₀ are each selected from hydrogen, alkyl having from 1 to 18 carbon atoms, aryl, hydroxyalkyl having from 1 to 3 atoms or mixtures thereof; R₉ is a divalent hydrocarbon having 1 to 13 carbon atoms, X is a monovalent cation; X' is halogen or R₄₈SO₄, wherein R₄₈ is alkyl having from 1 to 4 carbon atoms; k is from about 20 to about 98.9 mole percent; s and t are each from about 1 to about 10 mole percent or alternatively s is 0 and t is from about 1 to about 20 mole percent; and y is a large positive integer to provide a polymer having a molecular weight greater than 100,000.

25. The process claim 1 wherein said polymer is represented by the formula:

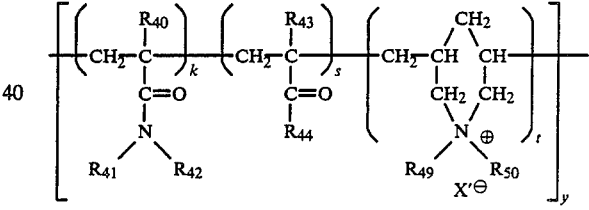

wherein R₄₀ is hydrogen or methyl; R₄₁ and R₄₂ are each selected from hydrogen, methyl and ethyl; R₄₃ is hydrogen or methyl; R₄₄ is —OR₄₅ or —R₉SO₃X, wherein R₄₅ is hydrogen, an alkali metal, an ammonium group or an organoammonium group of the formula (R₃₇) (R₃₈) (R₃₉) NH⁺ wherein R₃₇, R₃₈ and R₃₉ and R₄₉ and R₅₀ are each selected from hydrogen, alkyl having from 1 to 18 carbon atoms, aryl, hydroxyalkyl having from 1 to 3 atoms or mixtures thereof; R₉ is a divalent hydrocarbon having 1 to 13 carbon atoms, X is a monovalent cation; X' is halogen or R₄₈SO₄, wherein R₄₈ is alkyl having from 1 to 4 carbon atoms; k is from about 20 to about 98.9 mole percent; s and t are each from about 1 to about 10 mole percent and wherein t and s are the same; and y is a large positive integer to provide a polymer having a molecular weight greater than 100,000.

* * * * *